US 7,002,879 B2

(12) United States Patent
Goami et al.

(10) Patent No.: US 7,002,879 B2
(45) Date of Patent: Feb. 21, 2006

(54) LENS DRIVING APPARATUS

(75) Inventors: Kazutaka Goami, Tokorozawa (JP);
Jun Suzuki, Tokorozawa (JP); Shigeru Takaya, Tokorozawa (JP); Shigeyuki Sasanuma, Tokorozawa (JP); Shinichi Fujinoki, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 550 days.

(21) Appl. No.: 09/986,403

(22) Filed: Nov. 8, 2001

(65) Prior Publication Data
US 2002/0054546 A1 May 9, 2002

(30) Foreign Application Priority Data
Nov. 8, 2000 (JP) .............................. 2000-341060

(51) Int. Cl.
*G11B 7/00* (2006.01)
(52) U.S. Cl. ................................. 369/44.22; 369/44.15
(58) Field of Classification Search ............ 369/44.14, 369/44.15, 44.16, 44.17, 44.18, 44.19, 44.21, 369/44.22; 359/811, 813, 814, 822, 823, 359/824
See application file for complete search history.

(56) References Cited

U.S. PATENT DOCUMENTS

| 5,541,898 A | 7/1996 | Kasuga et al. |
| 5,870,373 A | 2/1999 | Choi et al. |
| 6,344,936 B1 * | 2/2002 | Santo et al. ............. 369/44.15 |
| 6,570,720 B1 * | 5/2003 | Kawano .................. 369/44.15 |

FOREIGN PATENT DOCUMENTS

| EP | 0 252 651 A1 | 1/1988 |
| EP | 0 536 484 A1 | 4/1993 |
| EP | 0 777 220 A2 | 6/1997 |
| EP | 1 124 225 A2 | 8/2001 |

* cited by examiner

Primary Examiner—Thang V. Tran
(74) Attorney, Agent, or Firm—Sughrue Mion, PLLC

(57) ABSTRACT

A lens driving apparatus for driving a movable body in a focus direction and a tracking direction is provided with: a holder, to which a focus coil, a tracking coil and a lens are installed, to thereby constitute the movable body; and a magnetic circuit for applying magnetic fluxes to the focus coil and the tracking coil, to thereby drive the movable body in the focus direction and the tracking direction. The tracking coil includes two sets each having upper and lower two coils arrayed in the focus direction such that the two sets are arrayed in the tracking direction. The magnetic circuit applies the magnetic fluxes opposite to each other along a jitter direction, with respect to the upper two coils and the lower two coils without applying the magnetic fluxes with respect to portions adjacent to the upper and lower two coils.

8 Claims, 25 Drawing Sheets

LENS DRIVING APPARATUS

BACKGROUND OF THE INVENTION

1. Field of the Invention

The present invention relates to a lens driving apparatus for a disc player for recording onto and/or reproducing from a disc, which is a record medium for a CD (Compact Disc), a DVD or the like.

2. Description of the Related Art

There is a lens driving apparatus for a disc player for recording onto and/or reproducing from a disc as a record medium for the CD or the DVD to correspond to a demand for a smaller, lighter and thinner structure The lens driving apparatus can be roughly classified into: a semiconductor optical unit having a light emitting element for emitting a light beam, a grating, a beam splitter, a light receiving device and the like; and an actuator unit having a moving portion. The semiconductor optical unit can be drastically miniaturized by wiring the semiconductor elements such as the light emitting element, the light receiving element and the like in a chip state, and then packaging them together with other optical parts with ceramic or resin member, to thereby make them into a module.

Also, the module into which the optical parts, the semiconductor elements and the like are integrated is produced in a dedicated process. Thus, the assembling accuracy of the optical parts and the like can be improved as compared with a conventional method of assembling respectively the individual parts on a printed substrate or the like. Hence, the performance as the module can be improved to thereby attain the stable performance. Moreover, the modularization of the optical parts is standardized by the miniaturization. Accordingly, the mass production efficiency can be improved to thereby attain the reduction in a cost.

On the other hand, the actuator unit can be drastically miniaturized and its weight can be drastically reduced, for example, by employing a printed substrate coil, in which a copper lamination print substrate in a form of film is etched to form a driving coil, instead of a conventional configuration in which a driving coil, such as a tracking coil, a focus coil or the like, is wrapped around a lens holder of a bobbin type.

The actuator unit is provided with: a magnet; and a moving unit in which a lens holder having the printed substrate coil and the objective lens is movably supported by four elastic bar members. With regard to the actuator unit, although the number of configuration parts is small and the structure is also simple, it has an important role of accurately making a beam spot on an information track on the disc, and also making the moving unit accurately follow a tracking error signal and a focus error signal.

By the way, the printed substrate coil constituting the actuator unit is configured such that a focus coil is typically formed at a center thereof, and that four tracking coils, in which sets composed of upper and lower two elements arranged in a focus direction are disposed on both sides of the focus coil, are formed on a flat surface. In this case, the magnet constituting the actuator unit employs such a structure that magnetic fluxes in directions opposite to each other along a jitter direction are applied to the two coils arranged in the upper portion and the two coils arranged in the lower portion. In the actuator unit having the above-mentioned configuration, if the actuator unit is driven in the focus direction, a rotationally driving force (i.e., the rolling phenomenon) is induced in the printed substrate coil.

If the rotationally driving force is induced, the actuator unit cannot make the moving unit accurately follow the tracking error signal or the focus error signal. Thus, the actuator unit requires an operation for canceling such a rotationally driving force. The method of canceling the rotationally driving force may be considered in which the actuator unit uses two kinds of printed substrate coils whose pattern shapes are different from each other and a pair of magnets, which are constituted correspondingly to these printed substrate coils and which are multi-polar-magnetized. However, by this method, it is difficult or impossible to reserve the space to newly add a part for canceling the rotationally driving force, and this runs counter to the standardization and the part saving configuration.

SUMMARY OF THE INVENTION

The present invention is proposed in view of the above mentioned problems. It is therefore an object of the present invention to provide a lens driving apparatus in which a rotationally driving force of a moving unit can be suppressed while employing a rather simple structure with less or no additional new part.

The above object of the present invention can be achieved by a lens driving apparatus for driving a movable body in a focus direction and a tracking direction provided with: a holder, to which a focus coil, a tracking coil and a lens are installed, to thereby constitute the movable body; and a magnetic circuit for applying magnetic fluxes to the focus coil and the tracking coil, to thereby drive the movable body in the focus direction and the tracking direction, the tracking coil including two sets each having upper and lower two coils arrayed in the focus direction such that the two sets are arrayed in the tracking direction, the magnetic circuit applying the magnetic fluxes opposite to each other along a jitter direction, with respect to the upper two coils and the lower two coils without applying the magnetic fluxes with respect to portions adjacent to the upper and lower two coils.

According to this lens driving apparatus of the present invention, the movable body is constituted as the focus coil, the tracking coil and the lens installed to the holder. The movable body is driven as the magnetic circuit applies the magnetic fluxes to the focus coil and the tracking coil, in the focus direction and the tracking direction. At this time, since the magnetic circuit applies the magnetic fluxes opposite to each other along the jitter direction, with respect to the upper two coils and the lower two coils while it does not apply the magnetic fluxes with respect to portions adjacent to the upper and lower two coils, it is possible to suppress the rotational moment force of the movable body by employing a rather simple structure with little or no increase of a new part.

The above object of the present invention can be also achieved by another lens driving apparatus for driving a movable body in a focus direction and a tracking direction provided with: a holder, to which a focus coil, a tracking coil and a lens are installed, to thereby constitute the movable body; and a magnetic circuit for applying magnetic fluxes to the focus coil and the tracking coil, to thereby drive the movable body in the focus direction and the tracking direction, the tracking coil including two sets each having upper and lower two coils arrayed in the focus direction such that the two sets are arrayed in the tracking direction, the magnetic circuit applying the magnetic fluxes opposite to each other along a jitter direction, with respect to the upper two coils and the lower two coils by an first density while applying the magnetic fluxes with respect to portions adjacent to the upper and lower two coils by a second density which is less than the first density.

According to this lens driving apparatus of the present invention, the movable body is constituted as the focus coil, the tracking coil and the lens installed to the holder. The movable body is driven as the magnetic circuit applies the magnetic fluxes to the focus coil and the tracking coil, in the focus direction and the tracking direction. At this time, since the magnetic circuit applies the magnetic fluxes opposite to each other along the jitter direction, with respect to the upper two coils and the lower two coils by the first density while it applies the magnetic fluxes with respect to portions adjacent to the upper and lower two coils by the second density less than the first density, it is possible to suppress the rotational moment force of the movable body to some extent by employing a rather simple structure with little or no increase of a new part.

In one aspect of the lens driving apparatus of the present invention, the two sets are arranged symmetrical about a center of gravity of the movable body.

According to this aspect, the movable body can be certainly moved by virtue of the tracking coil including the symmetrically arranged two sets each having upper and lower two coils In another aspect of the lens driving apparatus of the present invention, the focus coil is provided with a single coil arranged between the two sets, and the magnetic circuit applies the magnetic fluxes opposite to each other, with respect to an upper portion and a lower portion of the focus coil.

According to this aspect, it is possible to certainly suppress the rotational moment force of the movable body by employing a simple structure.

In another aspect of the lens driving apparatus of the present invention, the focus coil and the tracking coil are provided with printed substrate coils, which are printed on a single plane printed substrate.

According to this aspect, the lens driving apparatus can be constituted in a rather simplified structure, and it is possible to reduce the cost.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Figure 1:
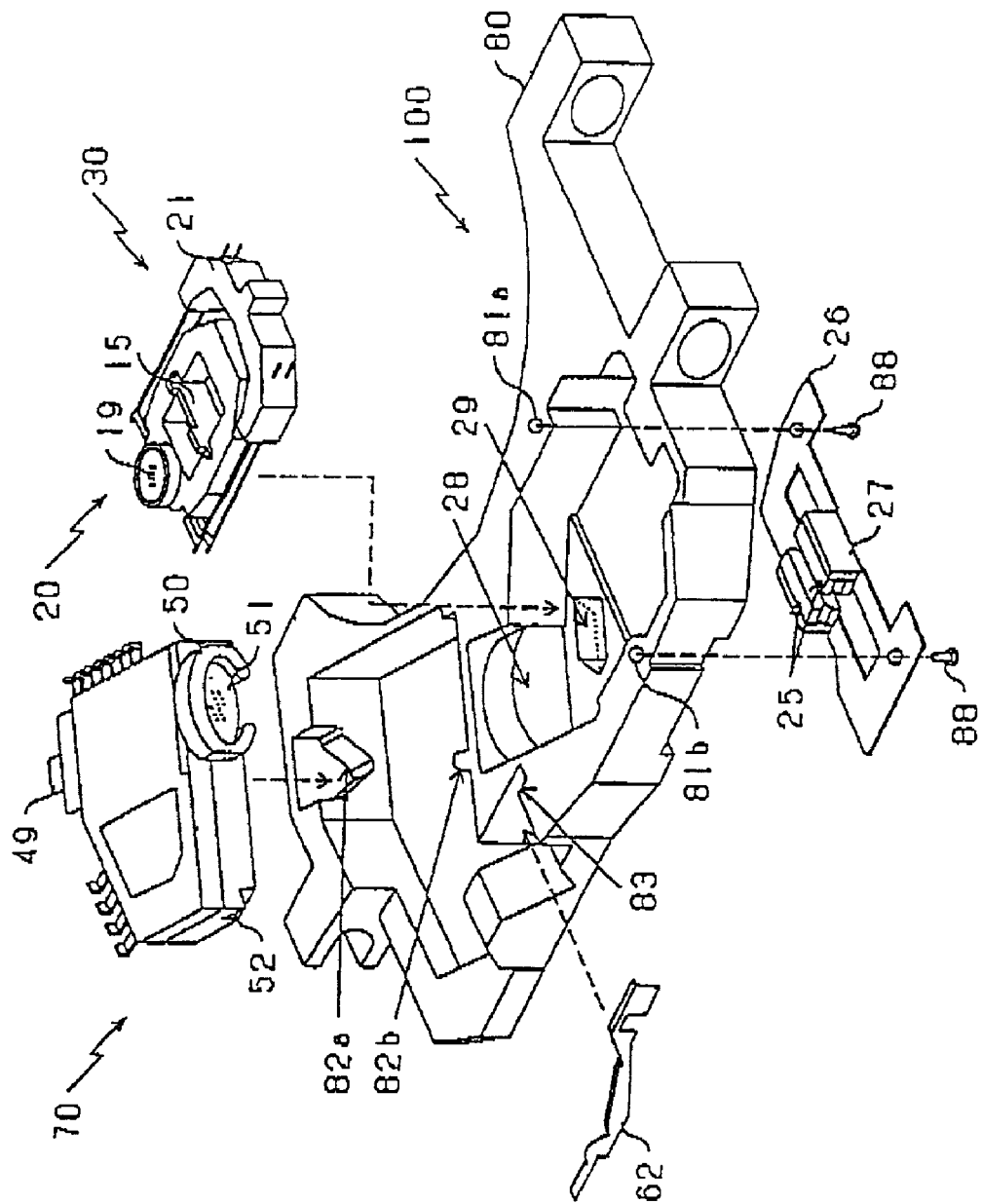
FIG. 1 is a perspective configuration development view showing a lens driving apparatus according to an embodiment of the present invention.
Figure 2:
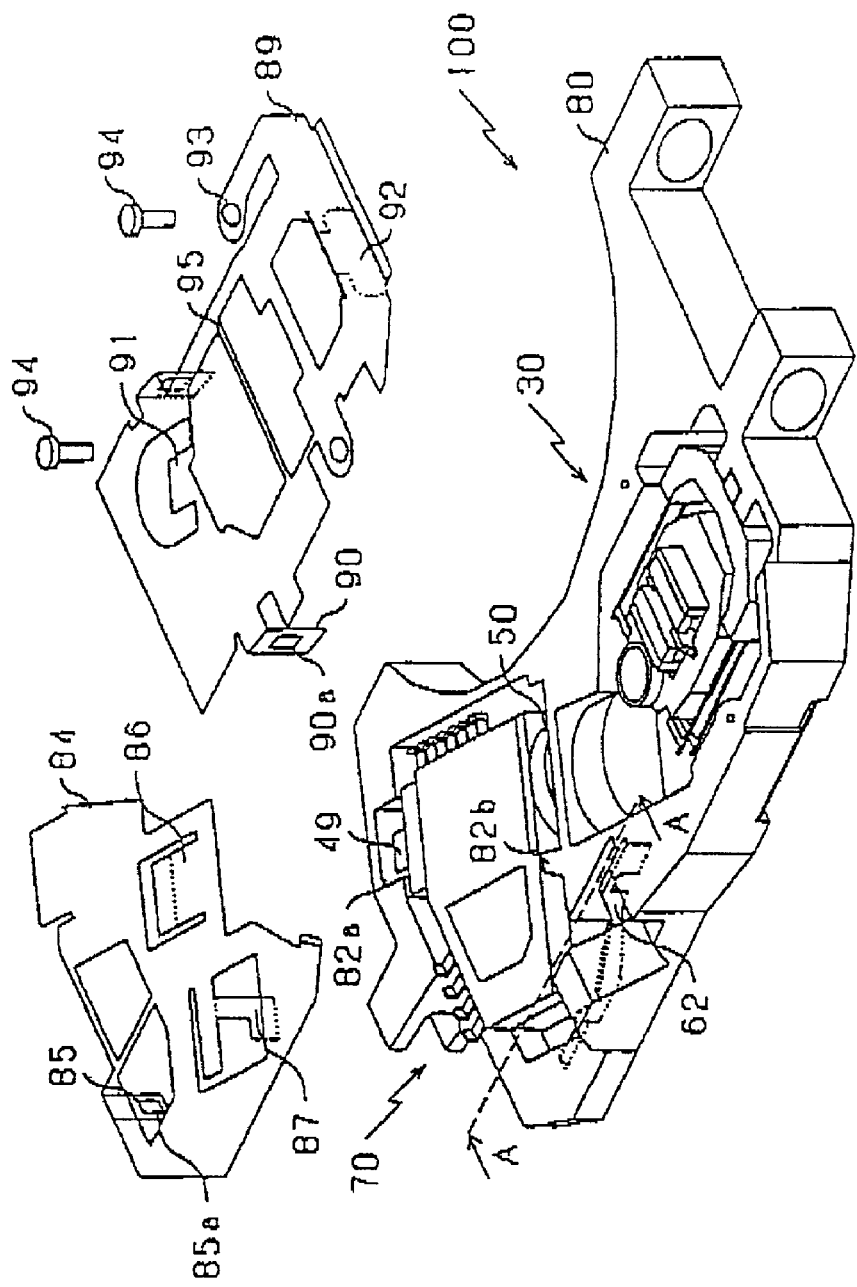
FIG. 2 is a perspective configuration development view showing a module plate and an actuator cover of the lens driving apparatus according to the embodiment.

A lens driving apparatus 100 according to an embodiment of the present invention will be explained below with reference to the drawings. The lens driving apparatus 100 according to this embodiment is provided with: a module 70 serving as one example of an optical part accommodating module for an optical pickup in which optical parts, such as two light emitting devices for emitting light beams whose wave length are different from each other, a grating, a beam splitter, a light receiving device and the like are integrated into a single resin package unit; and an actuator unit 30 in which an objective lens is built. So, the lens driving apparatus 100 is miniaturized and thinned. Also, such a lens driving apparatus 100 is designed so as to carry out a grating adjustment, which is typically done, from an outer side of the module 70. The entire configuration of the lens driving apparatus 100 will be described below with reference to FIG. 1 and FIG. 2. By the way, FIG. 1 and FIG. 2 are configuration development views showing the lens driving apparatus 100 according to this embodiment.

The lens driving apparatus 100 in this embodiment is provided with; a carriage body 80 molded from resin; the module 70 that accommodates the light emitting element for emitting a light beam as described later and the light receiving element and the like; a collimater lens 28 and a raising mirror 29 that are fixed at predetermined positions of the carriage body 80; an actuator base 26 made of metallic flat plate, where a pair of magnets 25 are adhered and fixed to two yokes 27 which are partially bent in L-shaped manner and are separated from each other; the actuator unit 30 including a suspension base 21 and a moving unit 20 serving as one example of a movable body; and a slide cam member 62 serving as one example of a grating adjusting mechanism of the module 70.

In the module 70, an annular guide 50 with which a cover glass 51 is engaged is formed on one side thereof, and a circular arc protrusion 49 is formed on the other side thereof The annular guide 50 of the module 70 is an opening from which the light beam is emitted, and an outer circumference thereof is formed in a form of substantial circle, and a central axis of the protrusion 49 is formed on an extension line of the center. In short, a central axis of the annular guide 50 and the central axis of the protrusion 49 are formed on the same straight line. Hereafter, it is referred to as an "axis line". By the way, instead of the protrusion, an annular guide 50 apart from the above-mentioned annular guide 50 may be formed and a central axis thereof may be formed on the same straight line, The module 70 is rotated with such an axis line as a center. Thus, a contact plane 52 is formed at a portion departing from the axis line.

The module 70 is mounted at a predetermined position of the carriage body 80. The circular arc protrusion 49 of the module 70 is inserted into a V-shaped supporter 82a formed on the carriage body 80, and the annular guide 50 of the module 70 is inserted into a V-shaped supporter 82b formed on the carriage body 80. At this time, the annular guide 50 of the module 70 is arranged at a position opposite to the collimater lens 28 fixed to the carriage body 80. Then, the contact hole 52 of the module 70 is arranged on a shift cam member 62 inserted into a slide groove 83 of the carriage body 80. The shift cam member 62 is sandwiched between the contact hole 52 of the module 70 and the slide groove 83 of the carriage body 80, and slidably held without any lateral turning and drop. Due to the above-mentioned configuration, the module 70 is rotatably supported by the V-shaped supporter 82a and the V-shaped supporter 82b formed on the carriage body 80.

On the other hand, the actuator base 26 where the magnet 25 is fixed to each of the pair of yokes 27, which are partially bent in the L-shaped manner and are separated from each other, is installed to two installation holes 81a and 81b made in the carriage body 80 through two vises 88 from a bottom side of the carriage body 80. Then, the actuator unit 30 is mounted from a top side of the carriage body 80. Accordingly, a printed substrate coil 15 of the actuator unit 30 is inserted into a substantial center of the pair of magnets 25. Also, an objective lens 19 of the actuator unit 30 is arranged at a position to cover the raising mirror 29.

The module 70 is held within the carriage body 80 by a module plate 84, as shown in FIG. 2. The module plate 84 is made of elastic copper plate that is excellent in heat conduction property, A plurality of fixing units 85 each having a hold hole 85a, a pushing unit 86 curved toward the inside, and a holding unit 87 that is bent toward the inside are disposed in the module plate 84. The module plate 84 is fixed by inserting the hold holes 85a of the fixing units 85 into a plurality of protrusions (not shown) formed on the carriage body 80. The module 70 is pushed against the side of the V-shaped supporter 82a of the carriage body 80 by the holding unit 70 of the module plate 84, and it is held in a condition that it is pushed against a bottom side of the carriage body 80 by the pushing unit 86. Also, the module plate 84 has a role of a heat sink for dissipating the heat generated by the module 70.

Also, the actuator unit 30 is held within the carriage body 80 by an actuator cover 89, as shown in FIG. 2. A plurality of fixing units 90 each having a hold hole 90a, a pushing unit 91 curved toward the inside, and a holding unit 92 that is bent toward the inside are disposed in the actuator cover 89, similarly to the module plate 84. The actuator cover 89 is fixed by inserting the hold holes 90a of the fixing units 90 into a plurality of protrusions (not shown) formed on the carriage body 80 and further using two vises 94 penetrating two fixing holes 93. By the way, the actuator unit 30 will be described later in detail.

The holding unit 92 of the actuator cover 89 is inserted into gap between the moving unit 20 and the suspension base 21, and it pushes the suspension base 21 against the side of the carriage body 80. The actuator unit 30 is held as the suspension base 21 is fixed to the carriage body 80. The pushing unit 91 of the actuator cover 89 is disposed to protect the drop of the collimater lens 28. Also the actuator cover 89 has a role of opening the portion above the objective lens 19 by disposing a window while leaving a partial stopper 95 in a center, and also regulating a movement range in a focus direction of the moving unit 20 through the stopper 95.

Next, the structure of the module 70 used in the lens driving apparatus 100 of this embodiment will be described below with reference to FIG. 3 to FIG. 5. The module 70 used in the lens driving apparatus 100 is designed such that a method of generating a tracking error signal is different between the CD and the DVD. As the method of generating the tracking error signal, there are a three-beam method and a phase difference method. The three-beam method is optimal for the CD. However, if the three-beam method is applied to the DVD, a signal leakage from a layer that is not targeted is induced especially in a case of a two-layer, or a cross talk from an adjacent track becomes a problem in a land groove record of recording on a phase change medium at a high density. The phase difference method is suitable for the DVD. However, if the phase difference method is applied to the CD, when a beam spot is small, a wave form of the tracking error signal does not become a sine wave. So, this may be a problem at a time of a track cross. Thus, the lens driving apparatus 100 in this embodiment is designed such that in a case of a reproduction from the CD, the tracking error signal is generated by the three-beam method suitable for a tracking error control of the CD after the pass through a grating 43, and in a case of a reproduction from the DVD, the tracking error signal is generated by the phase difference method suitable for the tracking control of the DVD. Those configurations will be described below.

The module 70 is provided with: an emitting unit 55 in which a plurality of semiconductor light emitting elements described later and the like are accommodated in a bottom case 40 molded from resin whose inside is hollow; and a light receiving unit 65 in which a plurality of semiconductor light receiving elements and the like are accommodated in a top case 56 molded from resin whose inside is hollow, similarly to the emitting unit 55. The structures of the respective configuration parts of the module 70 will be described below.

Figure 3:
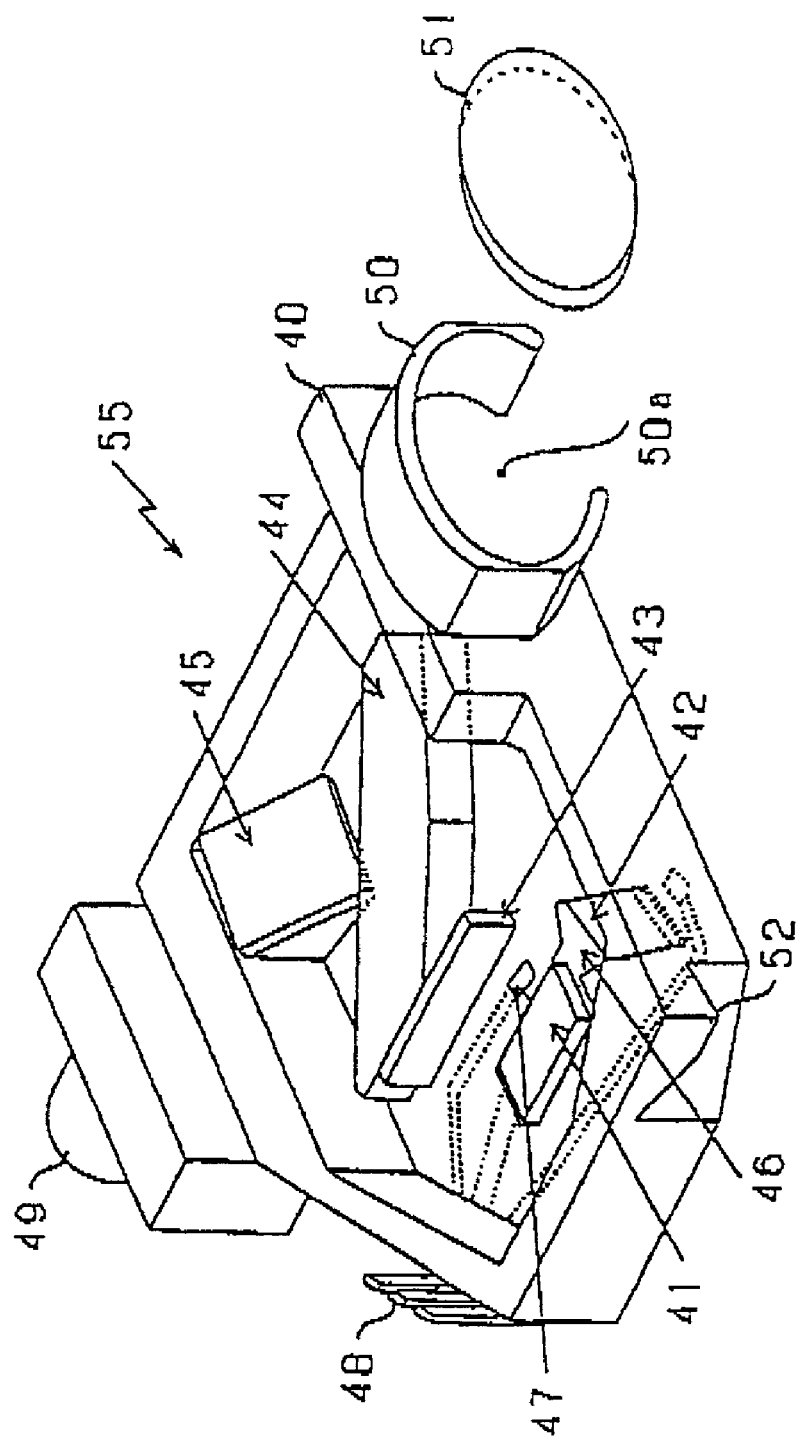
FIG. 3 is a perspective inner development view showing a light emitting unit constituting a module of the embodiment.

FIG. 3 is an inner development view showing the emitting unit 55. The emitting unit 55 is configured as shown in FIG. 3 by accommodating a first light emitting element 41 for emitting a light beam having a wave length of 780 nm to an inner bottom surface of the bottom case 40 serving as one portion of a part of a body, a second light emitting element 42 for emitting a light beam having a wave length of 650 nm, a grating 43 for generating a pair of sub beams for tracking error generation from the light beam emitted by the first light emitting element 41, a beam splitter 44, and a reflection mirror 45.

The bottom case 40 is molded from resin integrally with hoop material in which a plurality of electrode frames 47 and a plurality of fixing frames 46 for semiconductor chips are punched from a metallic pate that is excellent in electrically conductive property. The bottom case 40 is molded such that the fixing frame 46 and the electrode frame 47 are exposed on the inner bottom surface, and one ends of the fixing frame 46 and the electrode frame 47 are pulled out to the external portion as terminals 48.

Also, in the bottom case 40, the circular arc protrusion 49 is formed on one outer side, the annular guide 50 is disposed on the other side, and the discoid cover glass 51 is engaged so as to cover an opening window 50a of the annular guide 50. An axis line for coupling the central axis of the circular arc protrusion 49 and the central axis of the annular guide 50 to each other is formed so as to agree with an optical axis of a later-described optical part. Also, in the bottom case 40, the contact plane 52 is formed at a part of an outer wall corner away from the axis line for coupling the central axis of the circular arc protrusion 49 and the central axis of the annular guide 50. Such a contact plane 52 is formed so as to give a rotation to the module 70 with the optical axis as a center. It is formed on a plane inclined to a bottom surface of the bottom case 40.

The emitting unit 55 is fixed onto the fixing frame 46 molded by exposing the respective semiconductor chips of the first and second light emitting elements 41 and 42 on the inner bottom plane of the bottom case 40, by die bonding and the like. The respective electrodes are connected to the electrode frames 47 by wire bonding and the like. Also, the emitting unit 55 is configured such that the grating 43, the beam splitter 44 and the reflection mirror 45 which are the other optical parts and the like are arranged at the predetermined positions. The emitting unit 55 is designed such that since a power supply is applied from an external portion to the respective terminals 48, a light is singly emitted from only one of the first and second light emitting elements 41 and 42, and the light beam is emitted from the center of the annular guide 50 through the grating 43 and the beam splitter 44.

The structure of the light receiving unit 65 will be described below with reference to FIG. 4.

Figure 4:
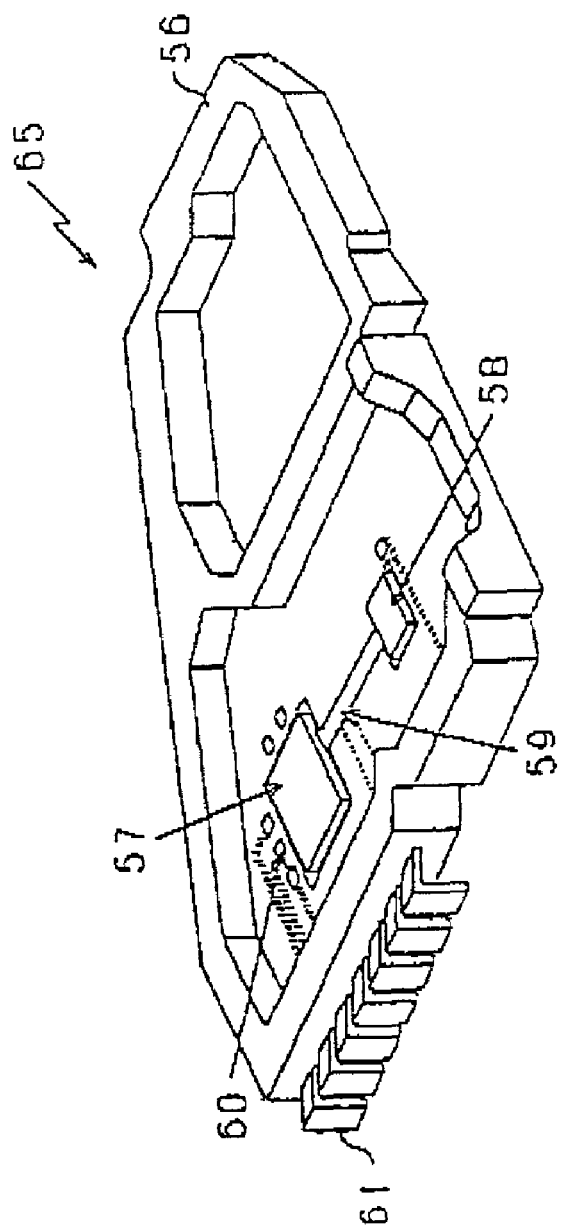
FIG. 4 is a perspective inner development view showing a light detector constituting the module of the embodiment.

As shown in FIG. 4, the light receiving unit 65 accommodates a light receiving element 57 and a monitor PD 58 in the inner bottom plane of the top case 56 that is a part of the body. The top case 56 is molded from resin integrally with hoop material in which a plurality of electrode frames 60 and a plurality of fixing frames 59 for semiconductor chips are punched from the metallic pate that is excellent in electrically conductive property, similarly to the bottom case 40. The top case 56 is molded such that the fixing frame 59 and the electrode frame 60 are exposed on the inner bottom surface, and one end is pulled out to the external portion as terminal 61.

The light receiving unit 65 is configured such that semiconductor chips of the monitor PD 58 and the light receiving element 57 are fixed onto the fixing frames 59 by die bonding and the like, and respective power sources and output electrodes are connected to the electrode frames 60 by wire bonding and the like. Thus, the supplies of the power source and the detections of the output signals from the monitor PD 58 and the light receiving element 57 are carried out through the terminal 61.

Figure 5:
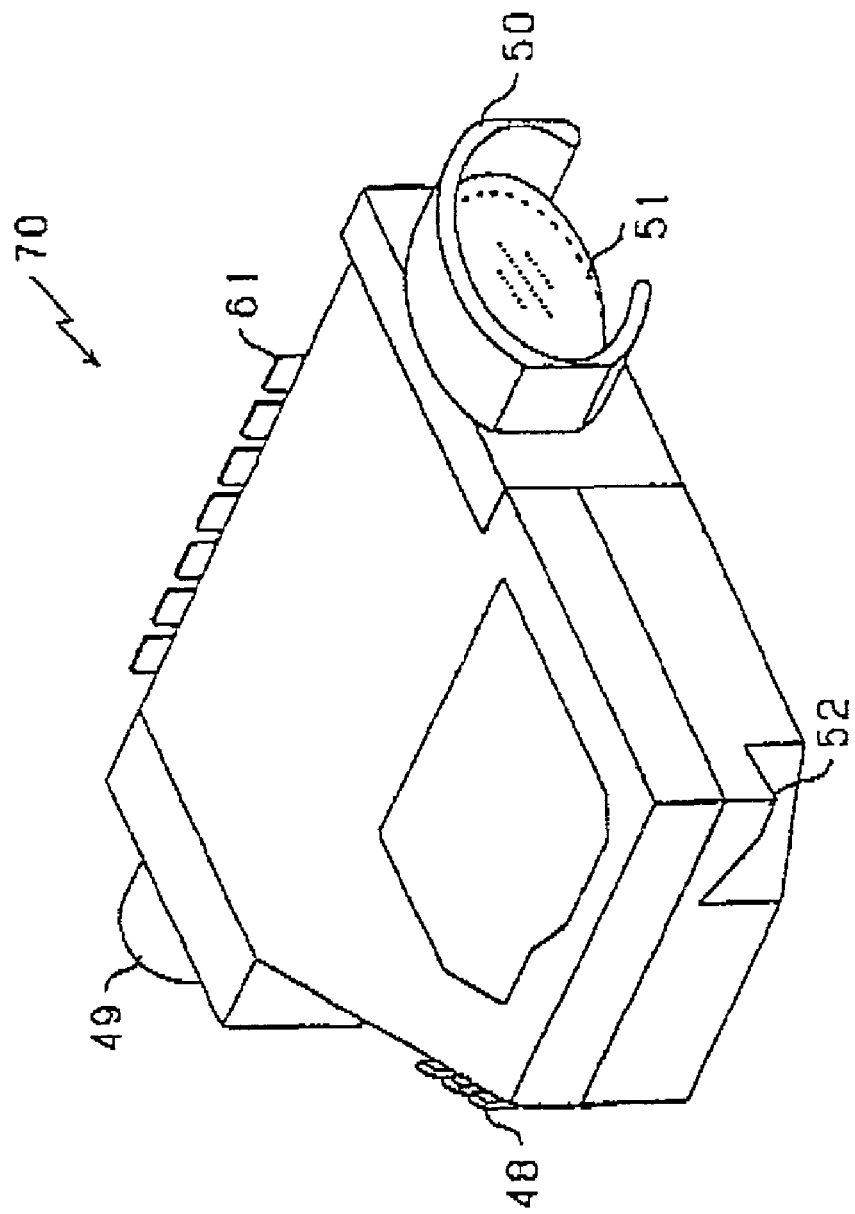
FIG. 5 is an external perspective view showing the module of the embodiment.

As shown in FIG. 5, the module 70 is configured such that the emitting unit 55 and the light receiving unit 65 are joined and adhered to each other through adhesive and the like while the optical parts are placed inside them. As mentioned above, the module 70 is designed such that the optical parts, such as the two light emitting elements 41 and 42 for emitting the light beams whose wave lengths are different from each other, the grating 43, the beam splitter 44, the light receiving element 57 and the like are packaged within the single resin body, and it is configured so as to be treated as one optical part whose performance is managed.

Figure 7:
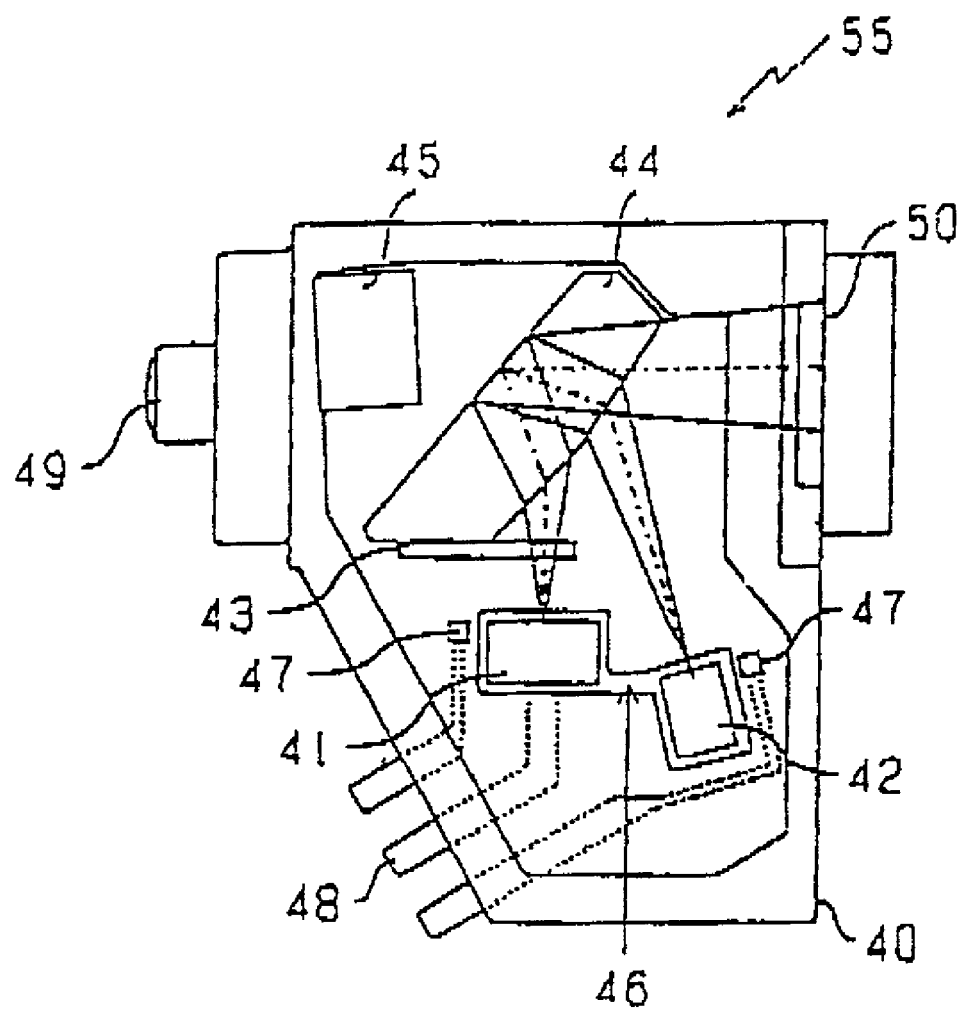
FIG. 7 is a schematic sectional view showing a light path in the light emitting unit of the embodiment.
Figure 8:
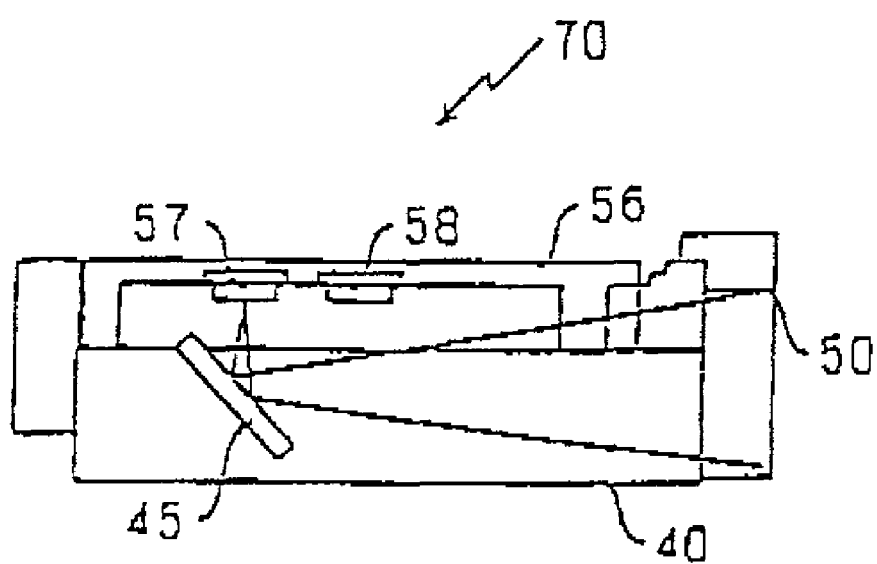
FIG. 8 is a schematic sectional view showing a light path from the light emitting unit to the light detector in the embodiment.

Next, an entire light path of the optical parts of the lens driving apparatus 100 according to this embodiment and a light path of the module 70 will be described below with reference to FIG. 6 to FIG. 8. By the way, FIG. 6 shows the entire light path of the optical parts of the lens driving apparatus 100, FIG. 7 shows the light path in the emitting unit 55, and FIG. 8 shows the light path from the emitting unit 55 to the light receiving unit 65.

In the emitting unit 55, a first light beam emitted by the first light emitting element 42 exhibits the following light path. As shown in FIG. 7, it is passed through the grating 43. Then, once it is inputted from one main surface of the beam splitter 44, it is reflected on a rear of the beam splitter 44, and is directed from the main surface again to the central axis of the annular guide 50. Also, a second light beam outputted by the second light emitting element 42 exhibits the following light path. That is, once it is inputted from the other main surface of the beam splitter 44, it is reflected on the rear of the beam splitter 44, and it is directed from the main surface again to the central axis of the annular guide 50. The beam splitter 44 has the structure having the two main surfaces whose inclinations are different with respect to the first and second light emitting elements 41 and 42, in order that the light path in which the first light beam is reflected on the rear of the beam splitter 44 and is directed to the central axis of the annular guide 50 is equal to the light path in which the second light beam is reflected on the rear of the beam splitter 44 and is directed to the central axis of the annular guide 50. Such a configuration enables the optical axes of the first and second light beams and the axis line of the module 70 to agree with each other.

Figure 6:
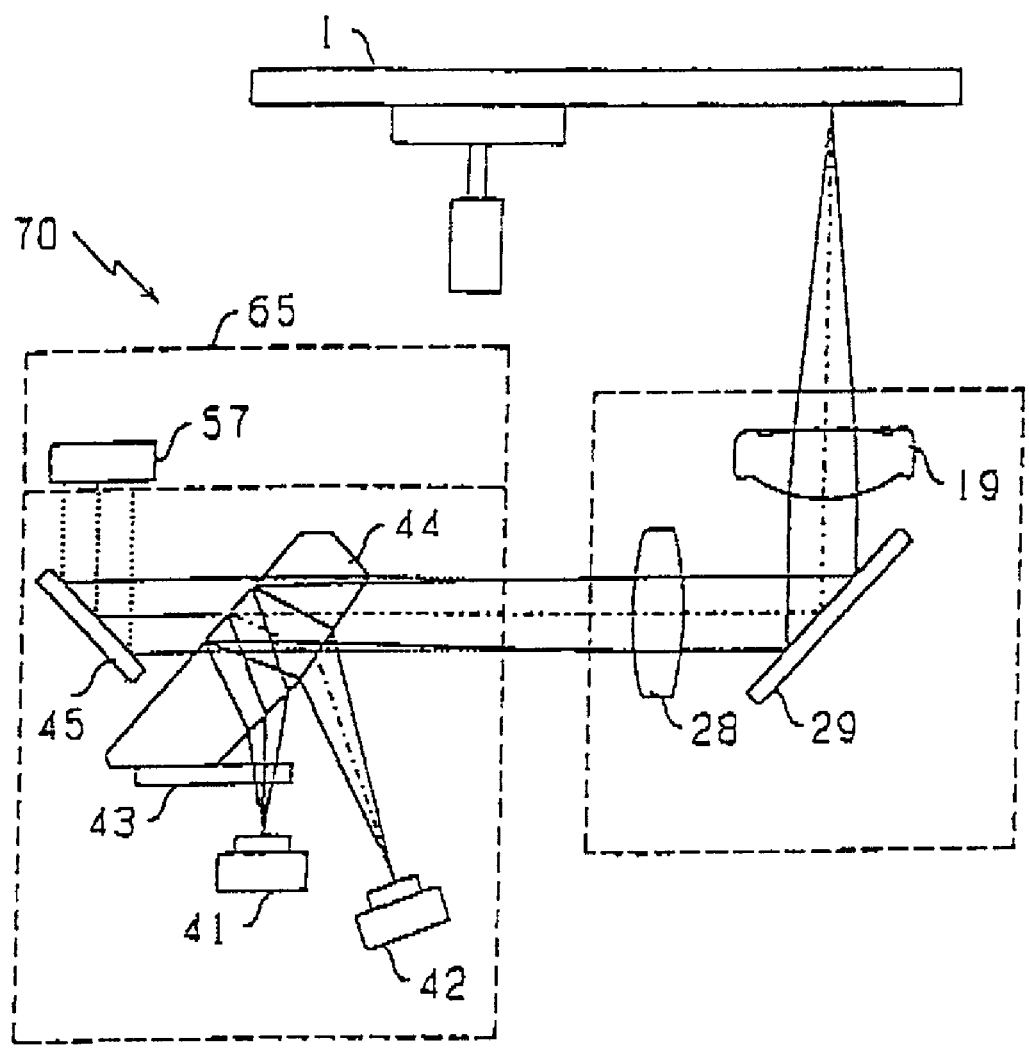
FIG. 6 is a schematic sectional view showing an entire light path in the lens driving apparatus of the embodiment.

The first or second light beam emitted by the module 70 exhibits the light path shown in FIG. 6 in which it is passed through the collimater lens 28 for converting the light beams into parallel lights, and is then directed through the raising mirror 29 to the objective lens 19. This first or second light beam reflected by the raising mirror 29 is converged by the objective lens 19 to then generate a beam spot on an information recording surface of a disc 1.

Also, the first or second light beam reflected on the information recording surface of the disc 1 is inputted through the objective lens 19, the raising mirror 29 and the collimater lens 28 to the central axis of the annular guide 50 constituting the module 70. This first or second light beam inputted to the module 70 is transmitted through the beam splitter 44, is reflected by the reflection mirror 45, and is irradiated onto the light receiving element 57, as shown in FIG. 8. The beam splitter 44 has a role of branching a returning path beam, which is directed from the disc 1 to the light receiving unit 65, from a going path beam, which is directed from the emitting unit 55 to the disc 1.

In the light receiving element 57, when the first light emitting element 42 is driven, an operational process based on the three-beam method is carried out, and when the second light emitting element 42 is driven, an operational process based on the phase difference method is carried out. Then, the light receiving element 57 outputs a tracking error signal, a focus error signal and an RF signal. Also, the monitor PD 58 detects and outputs the output strengths of the light beams of the first and second light emitting elements 41 and 42. The lens driving apparatus 100 controls the output strengths of the first and second light emitting elements 41 and 42, on the basis of a detection level outputted by the PD 58.

The lens driving apparatus 100 in this embodiment carries out the grating adjustment as an initial adjustment of a relative position of the sub beam in the three-beam method. Such a grating adjustment and a grating adjustment mechanism will be described below with reference to FIG. 9 to FIG. 15.

Figure 9:
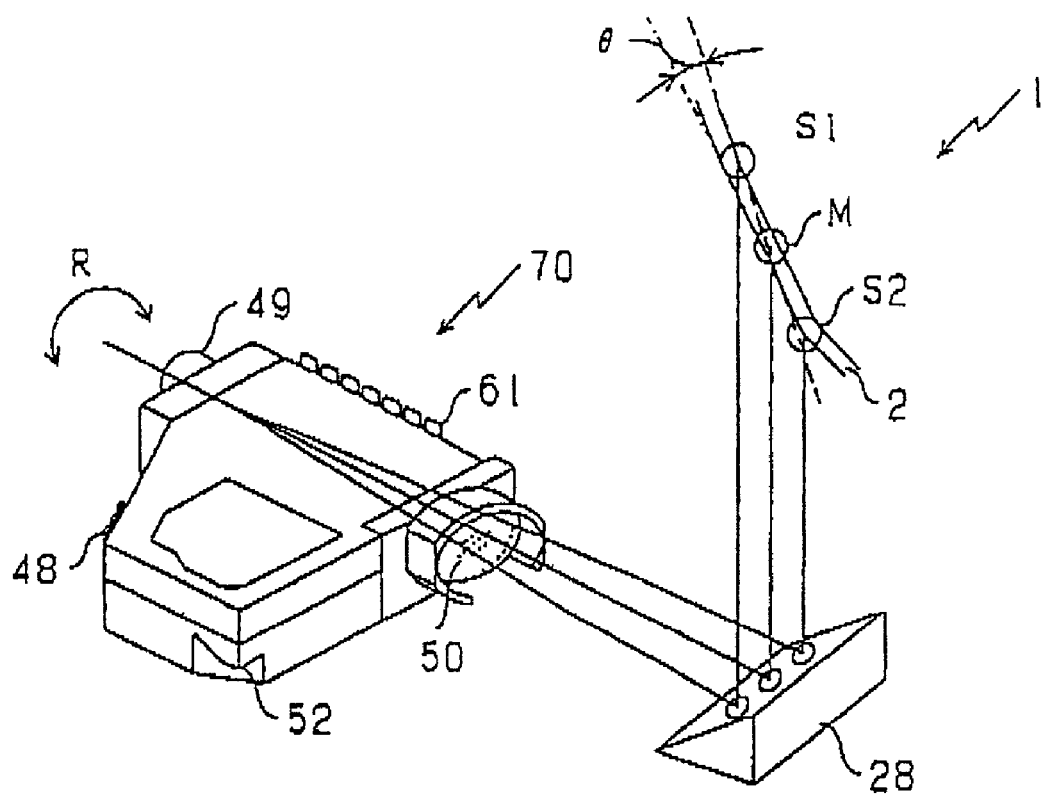
FIG. 9 is a schematic perspective view showing a relation between three beams and an information track in the embodiment.

As already explained with reference to FIG. 7, a pair of sub beams is generated as the first light beam emitted by the first light emitting element 42 is passed through the grating 43. Then, the reflection in the beam splitter 44 causes the three beams to be emitted from the central axis of the annular guide 50. Such three beams are sent through the collimater lens 28, the raising mirror 29 and the objective lens 19 to accordingly generate the three beam spots on an information track 2 on the disc 1. As shown in FIG. 9, the lens driving apparatus 100 generates a main beam M on a center of the information track 2 of the disc 1, and emits two sub beams S1 and S2 onto the information recording surface in a condition that their alignment direction is inclined at a predetermined angle (which is an angle indicated by θ in FIG. 9) with respect to a tangent direction of an information track to be followed.

As mentioned above, the module 70 is rotatably held with the axis line for coupling the central axis of the annular guide 50 and the central axis of the protrusion 49 as the center. Also, the module 70 is designed such that the optical axis and the axis line agree with each other. Thus, in the lens driving apparatus 100, it is possible to rotate the two sub beams S1 and S2 by a predetermined angle in a further plus or minus direction from the predetermined angle (θ) with respect to the tangent direction of the information track, which their alignment direction is to follow, by rotating the module 70 with the axis line as a center (which is indicated by an arrow R in FIG. 9). In short, in the lens driving apparatus 100, it is possible to carry out the grating adjustment for rotating only the beam spot positions of the two sub beams S1 and S2 while fixing the main beam M to the center of the information track 2. Also, the lens driving apparatus 100 in this embodiment is designed so as to generate the tracking error signal based on the phase difference method when recording onto and reproducing from the DVD. Thus, even if the grating adjustment optimal for the CD is carried out, it has no influence on the operation for recording onto and reproducing from the DVD.

Figure 10:
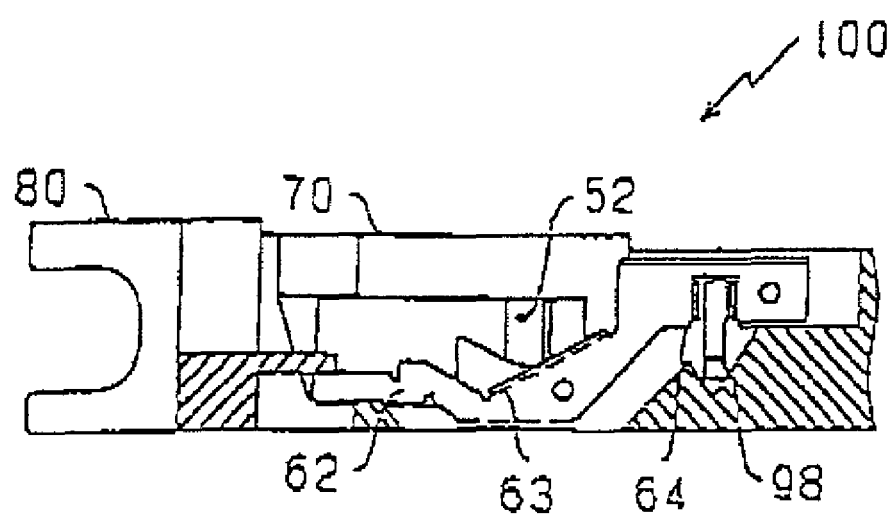
FIG. 10 is a sectional view for explaining a method of adjusting a grating of the module in the embodiment.
Figure 11:
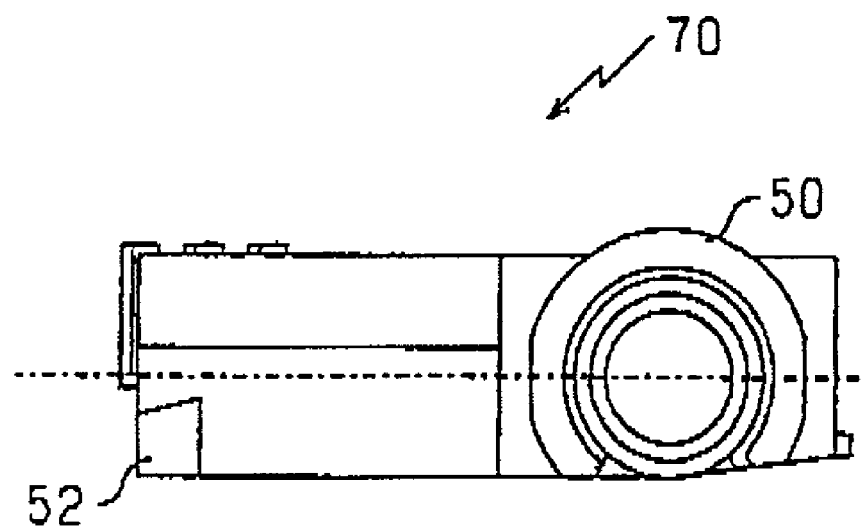
FIG. 11 is a front view for explaining the method of adjusting the grating of the module in the embodiment.
Figure 12:
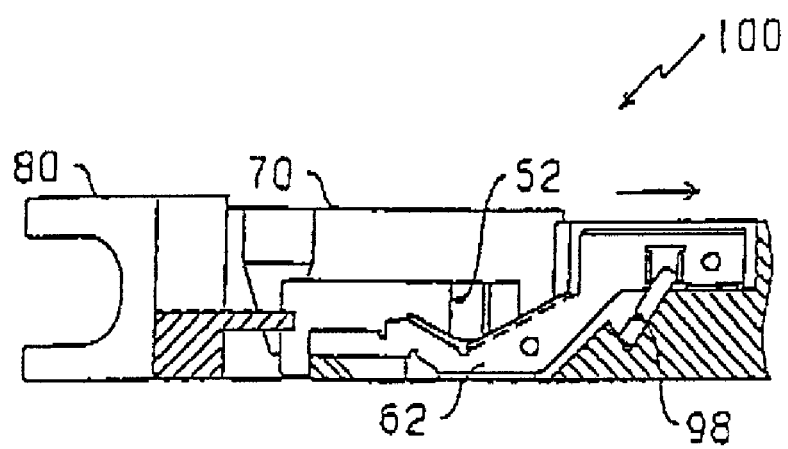
FIG. 12 is a sectional view for explaining the method of adjusting the grating of the module in the embodiment.
Figure 13:
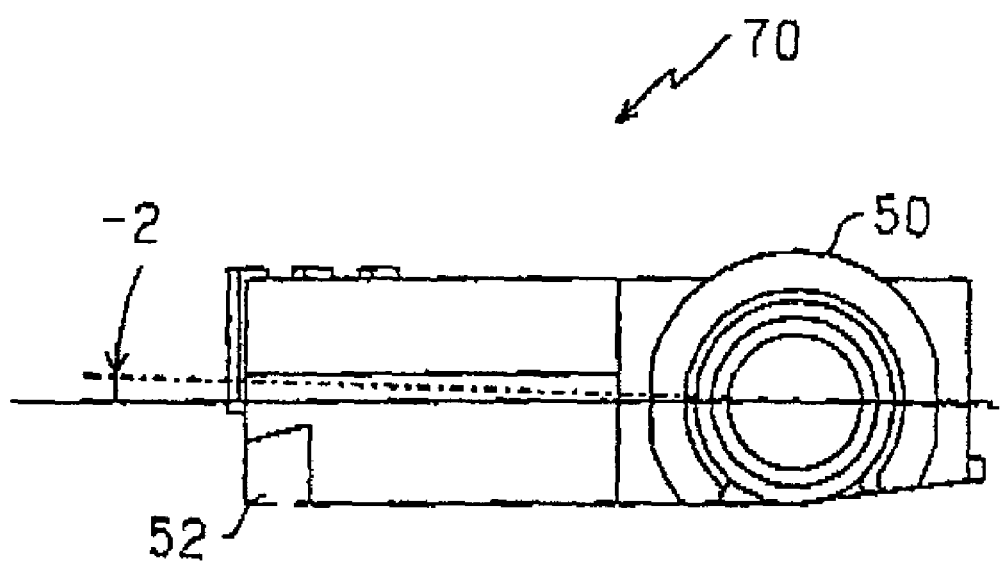
FIG. 13 is a front view for explaining the method of adjusting the grating of the module in the embodiment.
Figure 14:
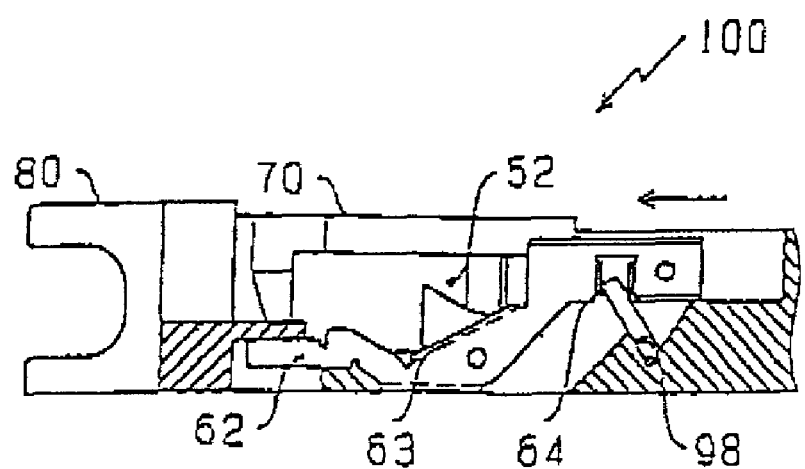
FIG. 14 is a sectional view for explaining the method of adjusting the grating of the module in the embodiment.
Figure 15:
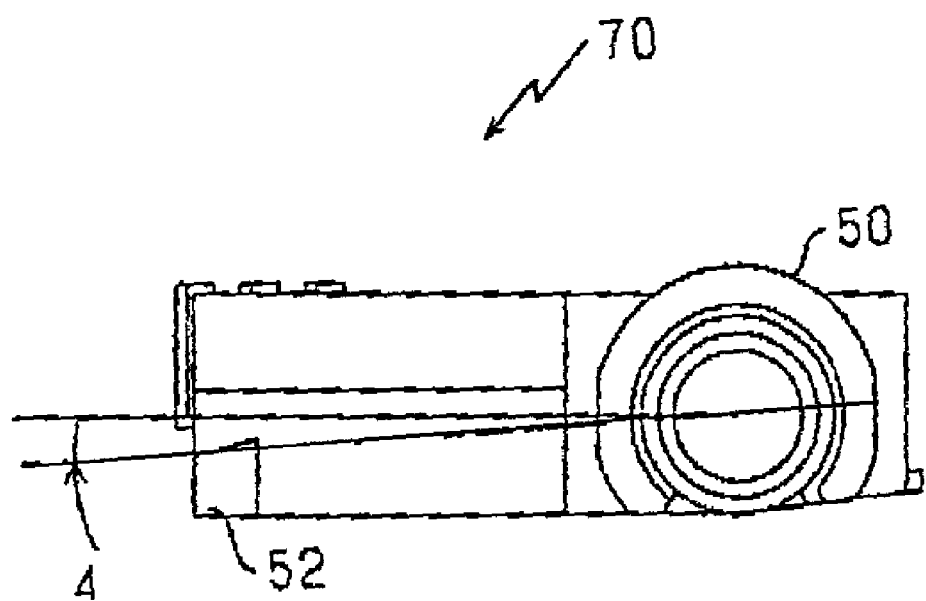
FIG. 15 is a front view for explaining the method of adjusting the grating of the module in the embodiment.

Next, the grating adjustment mechanism of the module 70 will be described below with reference to FIG. 10 to FIG. 15. FIG. 10, FIG. 12 and FIG. 14 are partially sectional views of the carriage body 80 near the slide cam member 62. FIG. 11, FIG. 13 and FIG. 15 are plan views showing the module 70 when it is viewed from the side of the annular guide 50.

By the way, the sectional views shown in FIG. 10, FIG. 12 and FIG. 14 show the A—A portion of the carriage body 80 shown in FIG. 2.

As shown in FIG. 10, the slide cam member 62 is the metallic flat plate in which a part thereof is bent so as to exhibit the strength. It has a cam plane 63 in contact with or abut onto the contact plane 52 of the module 70, and a concave adjustment hole 64 into which a minus driver 98 serving as one example of a grating adjustment member or the like is inserted. After the slide cam member 62 is inserted into the slide groove 83 of the carriage body 80, the contact cam 52 of the module 70 is placed on the cam plane 63 of the slide cam member 62. Accordingly, the slide cam member 62 is never turned over or dropped since it is sandwiched between the slide groove 83 of the carriage body 80 and the contact plane 52. The slide cam member 62 can be straightly moved in parallel to the plane including the axis line Also, the cam plane 63 is inclined with respect to the straight direction.

The module 70 is designed such that a position at which the minus driver 98 can be vertically inserted into the adjustment hole 64 is defined as an initial position of an inclination of zero. In the lens driving apparatus 100, the slide cam member 62 is set at the initial position to then mount the module 70. Thus, the module 70 is initially fixed to the carriage body 80 in the condition that the inclination is zero, as shown in FIG. 11.

FIG. 12 shows an example in which the minus driver 98 inserted into the adjustment hole 64 is rotated to the right. The slide cam member 62 is moved to a direction indicated by an arrow of FIG. 12. The contact plane 52 of the module 70 is downwardly moved along the cam plane 63 of the slide cam member 62. The module 70 is fixed, for example, in a condition that it is inclined at about −2 degrees with respect to the initial position, as shown in FIG. 13. Thus, in the lens driving apparatus 100, it is possible to generate the beam spots of the two sub beams S1 and S2 at positions where they are rotated by about −2 degrees from the predetermined angle (θ) with respect to the tangent direction of the information track, which their alignment direction is to follow.

Also, FIG. 14 shows an example in which the minus driver 98 inserted into the adjustment hole 64 is rotated to the left. The slide cam member 62 is moved to a direction indicated by an arrow of FIG. 14. The contact plane 52 of the module 70 is upwardly moved along the cam plane 63 of the slide cam member 62. The module 70 is fixed, for example, in a condition that it is inclined at about +4 degrees with respect to the initial position, as shown in FIG. 15. Thus, in the lens driving apparatus 100, it is possible to generate the beam spots of the two sub beams S1 and S2 at positions where they are rotated by about +4 degrees from the predetermined angle (θ) with respect to the tangent direction of the information track, which their alignment direction is to follow.

As mentioned above, the lens driving apparatus 100 in this embodiment is designed such that the module 70 is fixed to the carriage body 80 by using the module plate 84, and the contact plane 52 of the module 70 is in contact with and supported on the cam plane 63 of the slide cam member 62. The slide cam member 62 is held such that it is inserted into the slide groove 83, the contact plane 52 of the module 70 is supported on the cam plane 63, and its contact resistance is large. Thus, in the lens driving apparatus 100 in this embodiment, it is not necessary to fix the grating adjustment mechanism after the execution of the grating adjustment. Also, the slide cam member 62 can be straightly moved in parallel to the plane including the axis line of the module 70, which is a rotational central line of the grating adjustment. Hence, it is possible to concentrate the allowable space in the movement of the slide cam member 62 necessary for the grating adjustment within a thickness width of the module 70. Hence, this can contribute to the entire miniaturization.

Figure 16:
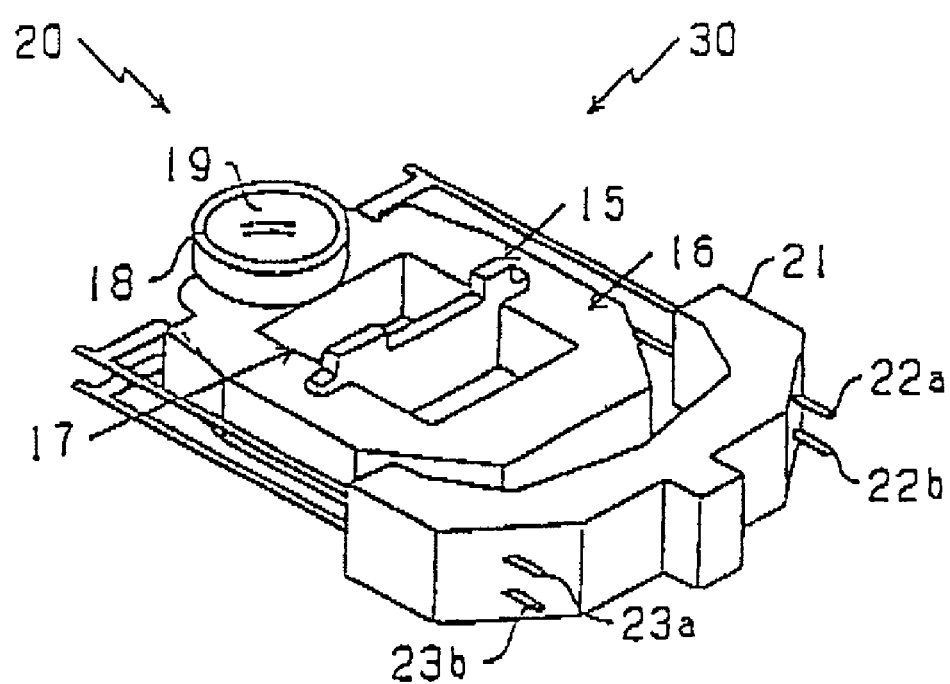
FIG. 16 is an external perspective view showing an actuator unit in the embodiment.
Figure 17:
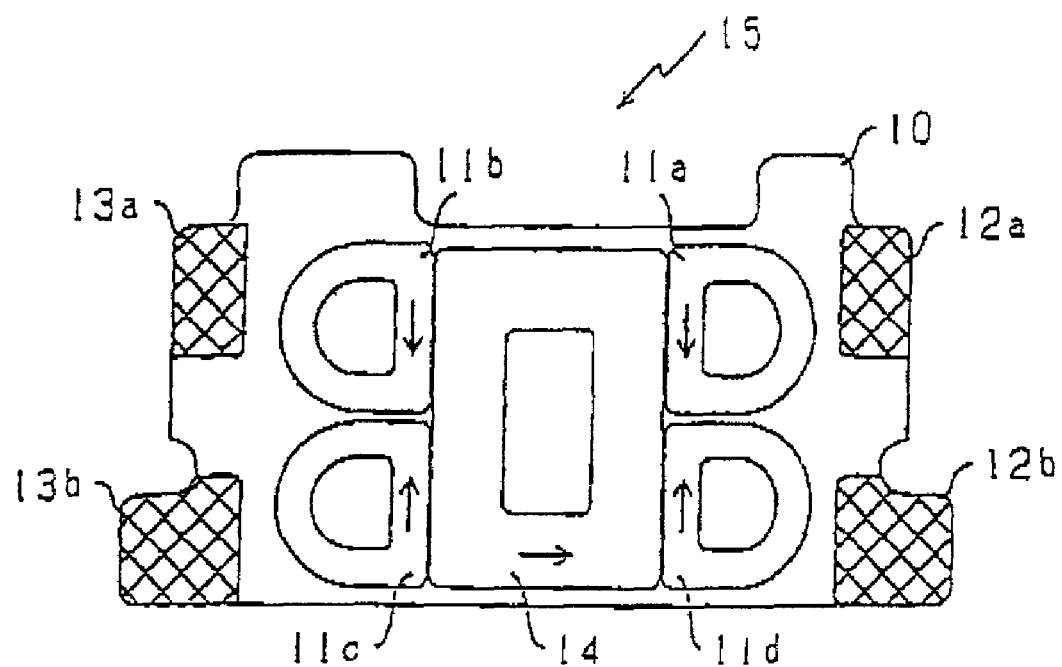
FIG. 17 is a plan view showing a printed substrate coil in the embodiment.
Figure 18:
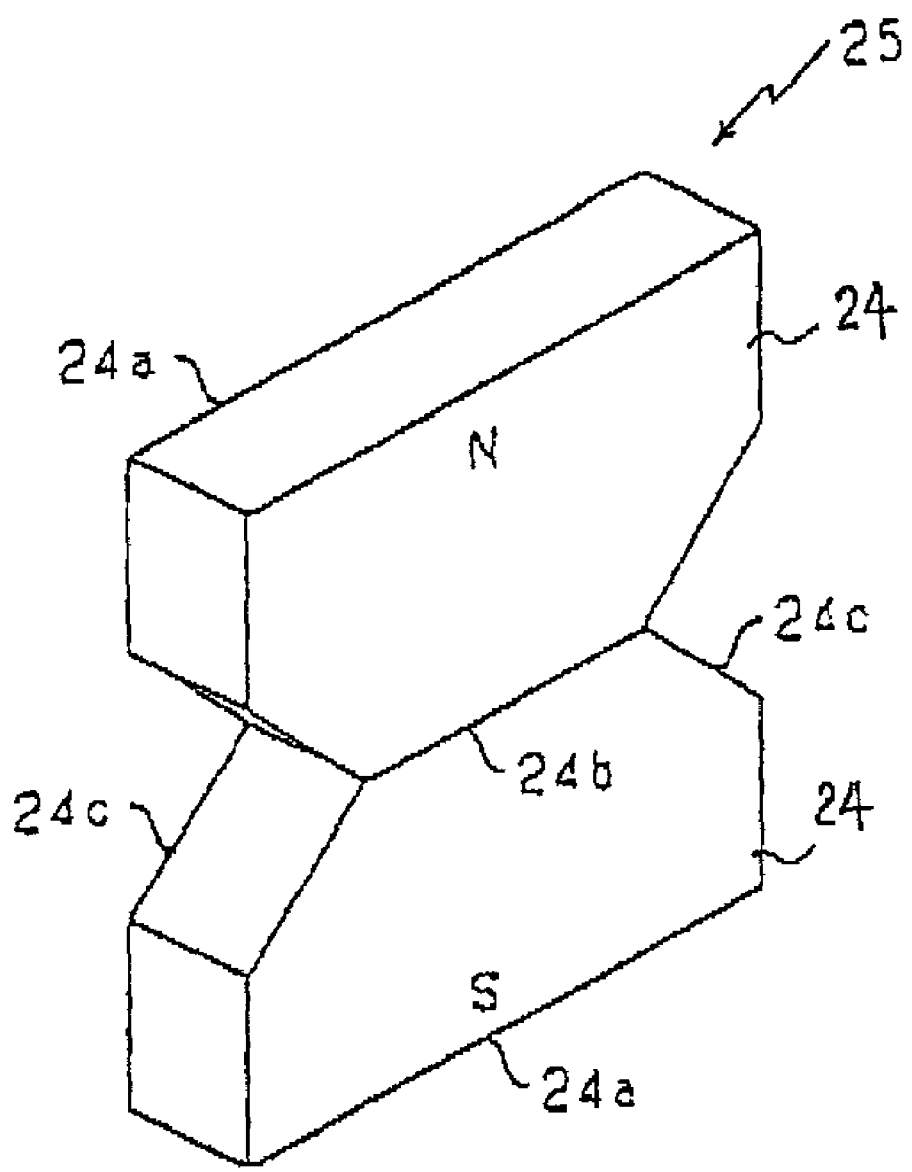
FIG. 18 is an external perspective view showing a magnet in the embodiment.
Figure 19:
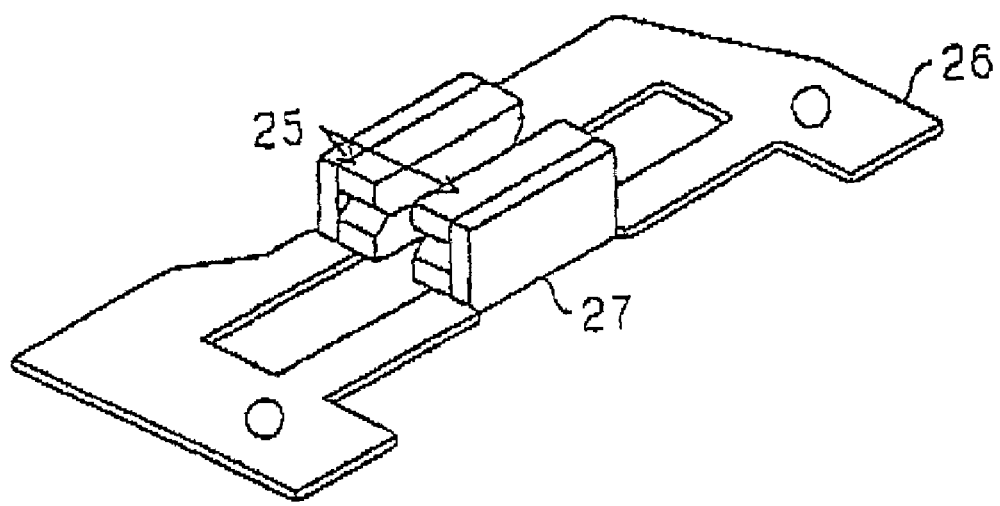
FIG. 19 is an external perspective view showing the magnet fixed to a yoke of an actuator base in the embodiment.
Figure 20:
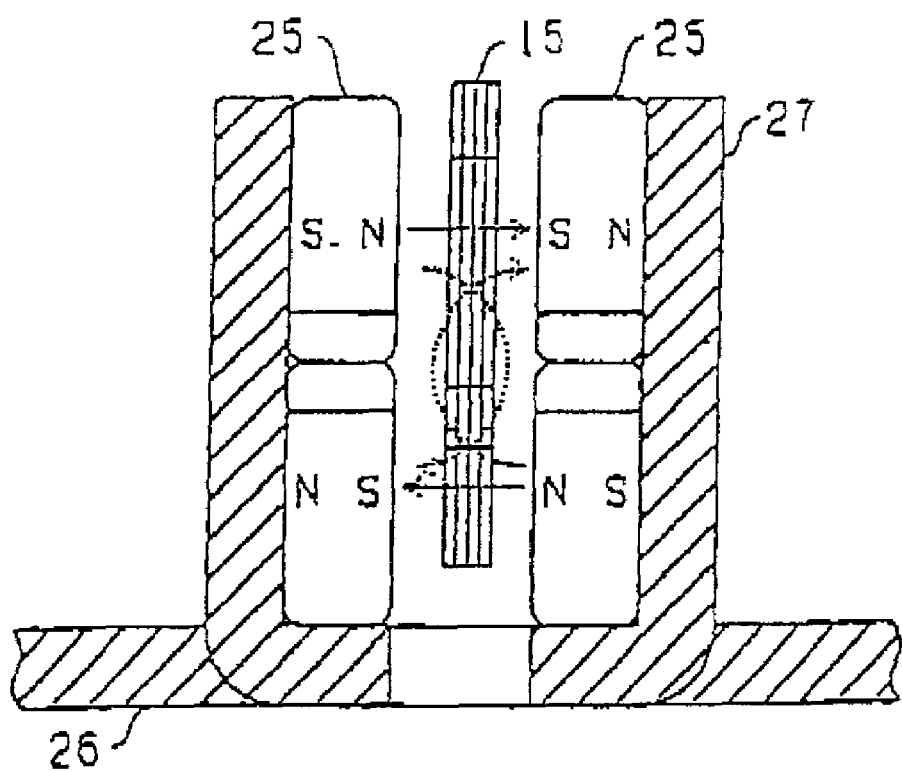
FIG. 20 is a side view showing the printed substrate coil and the magnet fixed to the yoke in the embodiment.
Figure 21:
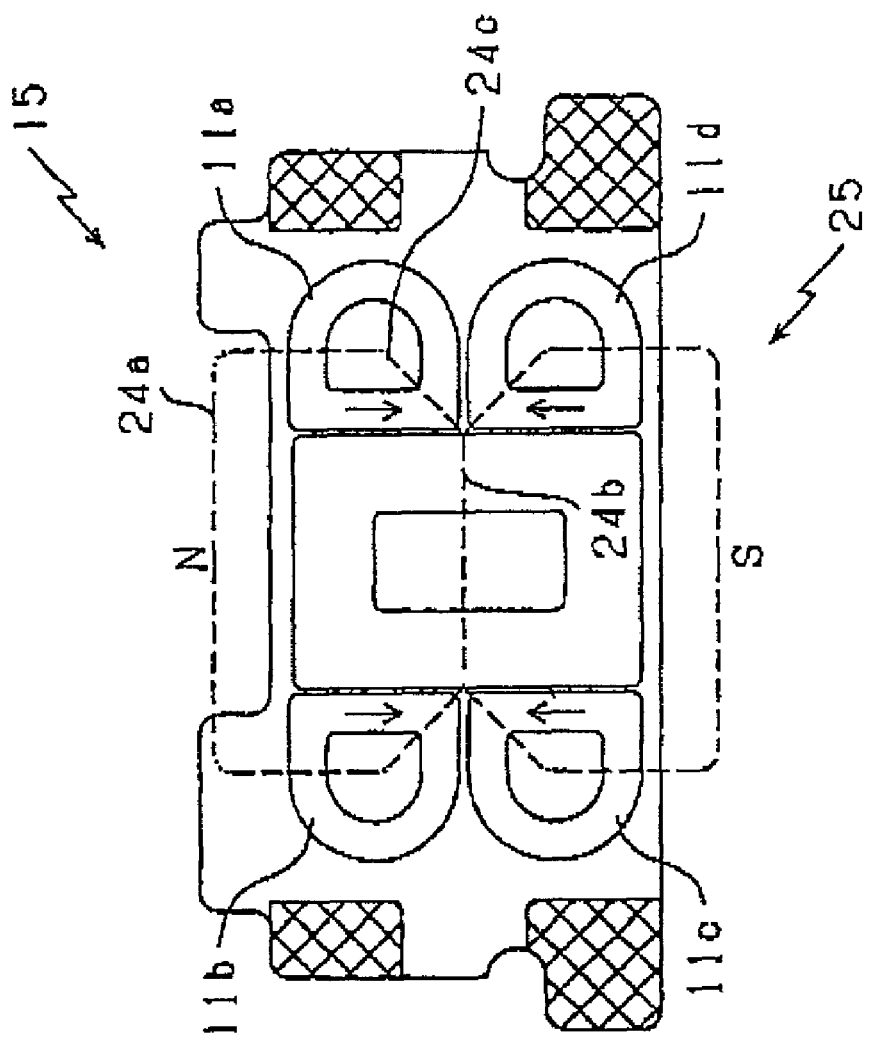
FIG. 21 is a plan view showing a positional relation between the printed substrate coil and the magnet in the embodiment.

Next, the configuration of the actuator unit 30 used in the lens driving apparatus 100 in this embodiment will be described below with reference to FIG. 16 to FIG. 21. FIG. 16 is a perspective view showing the outer shape of the actuator unit 30. FIG. 17 is a plan view showing the printed substrate coil 15. FIG. 18 is a perspective view showing the outer shape of a magnet 25. FIG. 19 is a perspective view showing the outer shape of the actuator base 26 to which the magnet 25 is adhered. FIG. 20 is a partially sectional view showing the positional relation between the printed substrate coil 15 and the magnet 25 adhered to the yoke 27. FIG. 21 is a plan view showing the positional relation between the printed substrate coil 15 and the magnet 25.

The actuator unit 30 is configured such that the moving unit 20 is movably supported by four elastic bar members 22a and 22b, 23a and 23b fixed to the suspension base 21, as shown in FIG. 16. The moving unit 20 is composed of the printed substrate coil 15 and the lens holder 16 to which the objective lens 19 is fixed. The lens holder 16 is the substantially rectangular member made from resin. An installation hole 18 for the objective lens 19 is made in one end thereof, and a rectangular opening 17 is made in a center thereof. Such an opening 17 is made so as to mount the printed substrate coil 15 at a substantial center thereof, and separately arrange a pair of magnets 25 on both sides of the printed substrate coil 15 inside the opening.

When the lens holder 16 and the suspension base 21 are molded from the resin, they are molded integrally with the four elastic bar members 22a and 22b, 23a and 23b. One ends of the four elastic bar members 22a and 22b, 23a and 23b are pulled out of the side of the suspension base 21, and are used as terminals to send the tracking error signal and the focus error signal to the printed substrate coil 15. Also, the other ends of the four elastic bar members 22a and 22b, 23a and 23b are extendedly installed to the inside of the lens holder 16, and connected to the printed substrate coil 15 mounted in the opening 17 of the lens holder 16.

The printed substrate coil 15 constituting the actuator unit 30 is formed by printing a plurality of coils on a double faced copper lamination substrate 10, which is a single plane substrate, and carrying out an etching operation, as shown in FIG. 17. In the printed substrate coil 15, a focus coil 14 is formed in a substantial center on one copper foil surface. Then, two tracking coils 11a and 11d are disposed adjacently to the right of the focus coil 14, and two tracking coils 11b and 11c are disposed adjacently to the left of the focus coil 14. In short, the four tracking coils 11a to 11d have two sets, each composed of upper and lower tow coils arrayed in the focus direction, and the two sets are arrayed in the tracking direction. Also, in the printed substrate coil 15, two tracking input/output terminals 12a and 12b and two focus input terminals 13a and 13b are disposed in an outer circumference of the double faced copper lamination substrate 10.

The tracking A coil 11a connected to the tracking input terminal 12a, in which a spiral coil is formed counterclockwise from the outer circumference to the inner circumference, is connected through a through hole and a copper foil pattern (that are not shown) to the tracking B coil 11b. The tracking B coil 11b, in which a coil is formed clockwise from the inner circumference to the outer circumference, is connected to the tracking C coil 11c. The tracking C coil 11c, in which a coil is formed counterclockwise from the outer circumference to the inner circumference, is connected through a through hole and a copper foil pattern (that are not shown) to the tracking D coil 11d. And, the tracking D coil 11d, in which a coil is formed clockwise from the inner circumference to the outer circumference, is connected to the tracking output terminal 12b.

Thus, the four tracking coils 11a to 11d constituting the printed substrate coil 15 are connected in series with the tracking input/output terminals 12a and 12b. Hence, for example, if a plus voltage is applied to the tracking input terminal 12 and a minus voltage is applied to the tracking output terminal 12b, the four tracking coils 11a to 11d are designed such that the electric currents flow in directions indicated by arrows of FIG. 17.

Also, the focus coil 14 constituting the printed substrate coil 15 is the single coil arranged between the two sets of the tracking coils. The focus coil 14 connected to the focus input terminal 13a, in which a spiral coil is formed counterclockwise from the outer circumference to the inner circumference, is connected to a through hole to the focus output terminal 13b. The focus coil 14 is designed such that it is connected in series with the focus input/output terminals 13a and 13b, and if a plus voltage is applied to the focus input terminal 13a and a minus voltage is applied to the focus output terminal 13b, the electric currents flow in directions indicated by arrows of FIG. 17.

The printed substrate coil 15 is mounted at a predetermined position of the opening 17 made in the lens holder 16. At this time, the two sets of the coils in the printed substrate coil 15 are arranged at the positions symmetrical about the center of the gravity of the moving unit 20. The lens holder 16 is molded integrally with the four elastic bar members 22a and 22b, 23a and 23b, as mentioned above. The ends of the four elastic bar members 22a and 22b, 23a and 23b are formed to be partially exposed on the surface of the lens holder 16, and connected through solder to the respective terminals 12a and 12b, 13a and 13b of the printed substrate coil 15 mounted in the opening 17.

The tracking input/output terminals 12a and 12b of the printed substrate coil 15 are soldered to the two elastic bar members 22a and 22b, and the focus input/output terminals 13a and 13b of the printed substrate coil 15 are soldered to the two elastic bar members 23a and 23b, respectively (refer to FIG. 16). Thus, the printed substrate coil 15 is designed such that when the tracking error signal is sent from the two elastic bar members 22a and 22b, the tracking drive current flows through the four tracking coils 11a to 11d, and when the focus error signal is sent to the two elastic bar members 23a and 23b, the focus drive current flows through the focus coil 14. Then, the printed substrate coil 15 is placed in the gap between a pair of magnets 24 as the actuator unit 30 is mounted on the carriage body 80.

Next, the structure of the magnet 25 constituting the actuator unit 30 will be described below with reference to FIG. 18. The magnet 25 is constructed by adhering two trapezoidal small magnets 24, in which both poles are magnetized, to each other as shown in FIG. 18. The small magnet 24 is constructed in the trapezoidal manner composed of a bottom portion 24a, a top plane 24b that is narrower in width than the bottom plane 24a, and two inclined portions 24c inclined at approximately 45 degrees. The magnet 25 is constructed by turning over another small magnet 24 upside-down and placing it on the top plane 24b of the small magnet 24, adhering their top planes to each other, and arranging the planes of the different magnet electrodes on the same plane.

As shown in FIG. 19, the magnets 25 are respectively fixed to the two yokes 27, which are constructed by partially bending the actuator base, 26 into a L-shape and separating them from each other, by using adhesive and the like. At this time, in order that the magnetic poles of the small magnets 24 located opposite to each other are different from each other, one magnet 25 is turned over and is fixed to the yoke 27. The arrangement of the polarity of this magnet 25 will be described below with reference to FIG. 20.

FIG. 20 is a side view showing the positional relation between the printed substrate coil 15 and the magnets 25 fixed to the yokes 27. As shown in FIG. 20, the magnets 25 are arranged such that the polarities of the small magnets 24 opposite to the printed substrate coil 15 are different from each other, and the polarities of the small magnets 24 opposite to each other are different from each other. Such arrangement generates the magnetic flux (which are indicated by dotted arrows in FIG. 20) sent from one small magnet 24 through the printed substrate coil 15 to the other opposite small magnet 24. Also, it generates a magnetic flux sent from the small magnet 24 placed in the upper portion, through the printed substrate coil 15, to the small magnet 24 placed in the lower portion. Thus, the pair of magnets 25 can give the strong magnetic flux to the tracking coil 11 and the focus coil 14 of the printed substrate coil 15.

FIG. 21 is a plan view showing the positional (initial positional) relation between the magnets 25 and the printed substrate coil 15. As shown in FIG. 21, the width of the bottom plane 24a of the small magnet 24 constituting the magnet 25 is configured so as to cover up to the vicinity of the substantial centers of the four tracking coils 11a to 11d. The width of the top plane 24b of the small magnet 24 is configured substantially equal to the width in the tracking direction of the focus coil 14. Also, the inclination portion 24c of the small magnet 24 is configured so as to overlap with a central line of approximately 45 degrees passing through the centers of the respective tracking coils 11a to 11d.

As shown in FIG. 21, the magnet 25 serving as the magnetic circuit is designed so as to apply the magnetic fluxes opposite to each other along a jitter direction (which is an array direction of the pair of magnets 25 located opposite to each other, namely, a direction vertical to a paper plane in FIG. 21) to the two tracking coils 11a and 11b arranged in the upper portion and the two tracking coils 11c and 11d arranged in the lower portion, and further applying the magnetic fluxes opposite to each other to the upper portion and the lower portion of the focus coil 14. Also, the magnet 25 is designed so as not to apply the magnetic fluxes to the portions adjacent to the two upper tracking coils 11a and 11d and the two lower tracking coils 11b and 11c. The lens driving apparatus 100 employs such magnets 25 to thereby suppress the rotationally driving force affecting the printed substrate coil 15, as described later.

Figure 22:
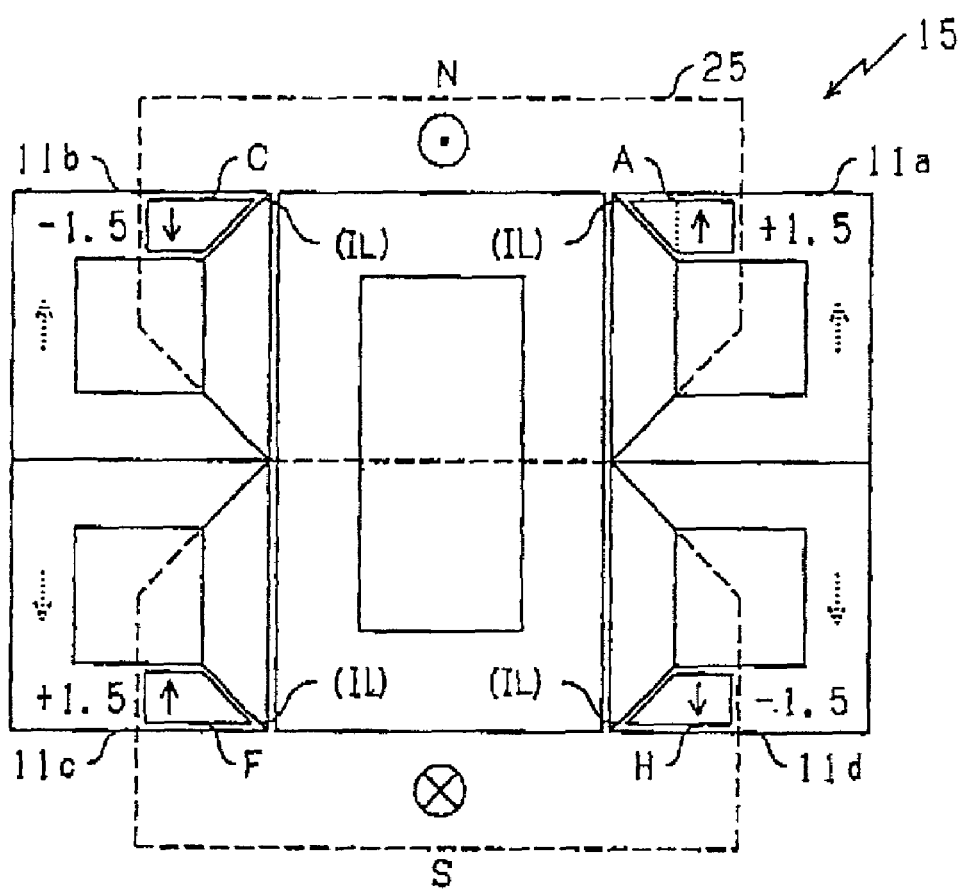
FIG. 22 is a schematic plan view for explaining an operation of a rotationally driving force induced in the printed substrate coil in the embodiment.

Next, the operation of the rotationally driving force occurring in the printed substrate coil 15 will be described below with reference to FIG. 22 to FIG. 25. When the operation of the printed substrate coil 15 is described, in order to represent the occurrence of the rotationally driving force as a numeral, it is assumed that the magnets 26 and the four tracking coils 11a to 11d are indicated by using the manner in which they can be easily represented as numerals. In short, in order to clarify the driving forces in the respective portions of the four tracking coils 11a to 11d (the driving forces in parts of the coils generated by the orientations of the magnetic fluxes and the orientations of the electric currents flowing through the coils), the coils are represented as squares, as shown in FIG. 22. Four corners of the square coil imply the boundaries between the driving forces occurring in the tracking direction of the printed substrate coil 15 and the driving forces occurring in the focus direction. Then, it is assumed here that those portions are evidently separated by indicating them with slant lines (indicated by lines "IL" in FIG. 22). Also, in order to clarify the suppression effect of the rotationally driving force occurring in the printed substrate coil 15, it is described together with a rotationally driving force when the magnet 25 is replaced by a rectangular magnet 28 as a comparison example.

In FIG. 22, if the magnet 25 has the polarity shown in FIG. 22 and the drive currents flow through the tracking coils 11a to 11d in the directions indicated by dotted arrows in FIG. 22, driving forces generated from regions P, Q, R and S of the respective tracking coils 11a to 11d become the forces (a left direction on the paper plane in FIG. 22) along the same direction as the tracking direction, and this synthesized force becomes the originally tracking drive force. However, in the tracking coils 11a to 11d, since the magnetic forces are applied to the magnets 25, even in the regions besides the above-mentioned regions P, Q, R and S. Thus, the driving forces are induced even from those regions.

In FIG. 22, a driving force in a focus direction indicated by the arrow is induced in a portion A of the tracking coil 11a. Here, an area of the portion A of the tracking coil 11a can be represented by one square and one right triangle. Thus, if the portion of the square is assumed to be "1" and the portion of the right triangle is assumed to be "0.5", it can be numerically represented as "1.5". Also, the driving force induced in the portion A of the tracking coil 11a is upwardly induced in the focus direction. Hence, this is represented as an upward arrow, and it is represented as "+1.5" together with the above-mentioned numerical representation.

When the driving forces of the respective tracking coils 11 are determined by using the similar method, a driving force of a portion C of the tracking coil 11 is "−1.5", a driving force of a portion F of the tracking coil 11c is "+1.5", and a driving force of a portion H of the tracking coil 11d is "−1.5". The driving force induced in the portion A of the tracking coil 11a and the driving force induced in the portion H of the tracking coil 11d have the same strength and the directions opposite to each other. Thus, these induced driving forces are canceled out. Similarly, the driving force induced in the portion C of the tracking coil 11b and the driving force induced in the portion F of the tracking coil 11c have the same strength and the directions opposite to each other. Thus, these induced driving forces are canceled out. Hence, the driving forces in the focus directions are not induced in the respective tracking coils 11a to 11d. Therefore, the rotationally driving force is not induced in the printed substrate coil 15.

Figure 23:
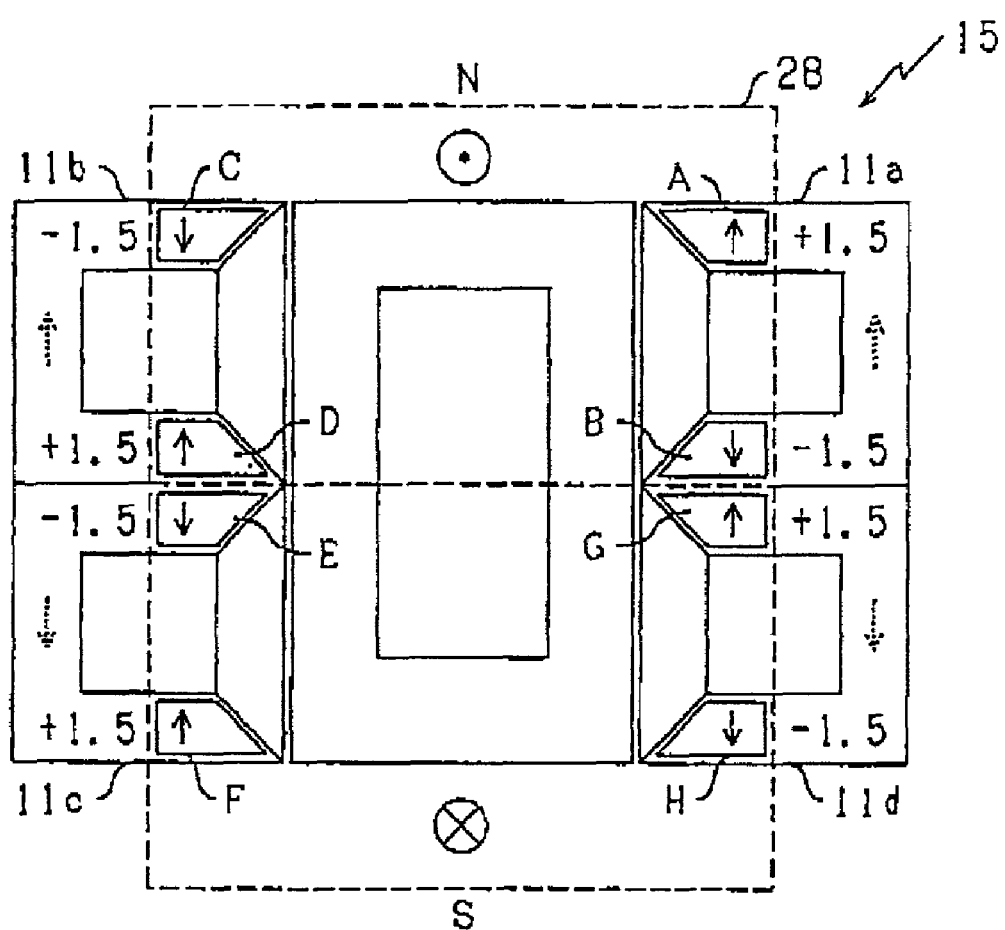
FIG. 23 is a schematic plan view for explaining an operation of the rotationally driving force induced in the printed substrate coil in the embodiment.

Next, with reference to FIG. 23, as a comparison example, the case in which the magnet 25 is replaced by a rectangular magnet 28 will be described below. As shown in FIG. 23, the driving force in the focus direction induced in each tracking coil 11 in using the rectangular magnet 28 is newly induced in a portion B of the tracking coil 11a, a portion D of the tracking coil 11b, a portion E of the tracking coil 11c and a portion G of the tracking coil 11d, as compared with the case of using the magnet 25 in the trapezoidal shape. Similarly to the above-mentioned case, when the driving forces of the respective tracking coils 11a to 11d are determined and are then compared, the driving forces in the focus direction of the respective portions of the tracking coils 11a to 11d generate the driving forces having the same strength and the directions opposite to each other, to be thereby cancelled out by each of the tracking coils 11a to 11d in the respective insides thereof. Hence, the rotationally driving force is not induced in the printed substrate coil 15.

Figure 24:
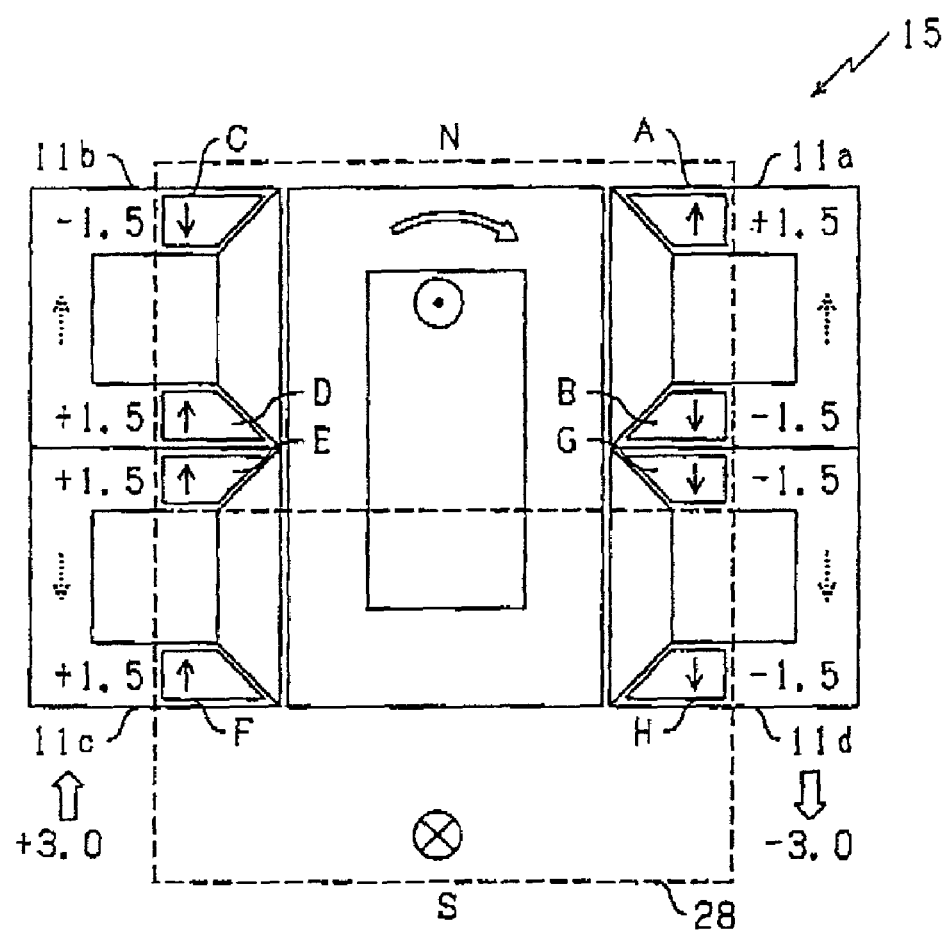
FIG. 24 is a schematic plan view for explaining an operation of the rotationally driving force induced in the printed substrate coil in the embodiment.

Next, a comparison example when the printed substrate coil 15 is moved upwardly in the focus direction with respect to the initial position as shown in FIG. 24 will be described below. In this case, the portion E of the tracking coil 11c and the portion G of the tracking coil 11d become in such a condition that they receive the influence of magnetic fluxes from an N-pole of the magnet 28. The respective driving forces are determined similarly to the above-mentioned case. In the tracking coil 11a and the tracking coil 11b, the driving forces in the focus direction are not induced similarly to the case that they are at the initial positions.

On the other hand, in the tracking coil 11c, a driving force of "+1.5" is induced in the portion E by the magnetic fluxes from the N-pole, which is then combined with the driving force of "+1.5" induced in the portion F, to thereby induce a driving force (indicated by a hollow arrow in FIG. 24) of "+3.0" in the focus direction Also, in the tracking coil 11d, a driving force of "−1.5" is induced in the portion G by the magnetic fluxes from the N-pole, which is then combined with the driving force of "−1.5" induced in the portion H, to thereby induce a driving force (indicated by a hollow arrow in FIG. 24) of "−3.0" in the focus direction. Thus, in the printed substrate coil 15, a rightward rotational moment force is induced by the driving force in the focus direction symmetrically about those two gravity centers. This rotational moment force has the strength proportional to the synthesized driving force of "3.0".

Figure 25:
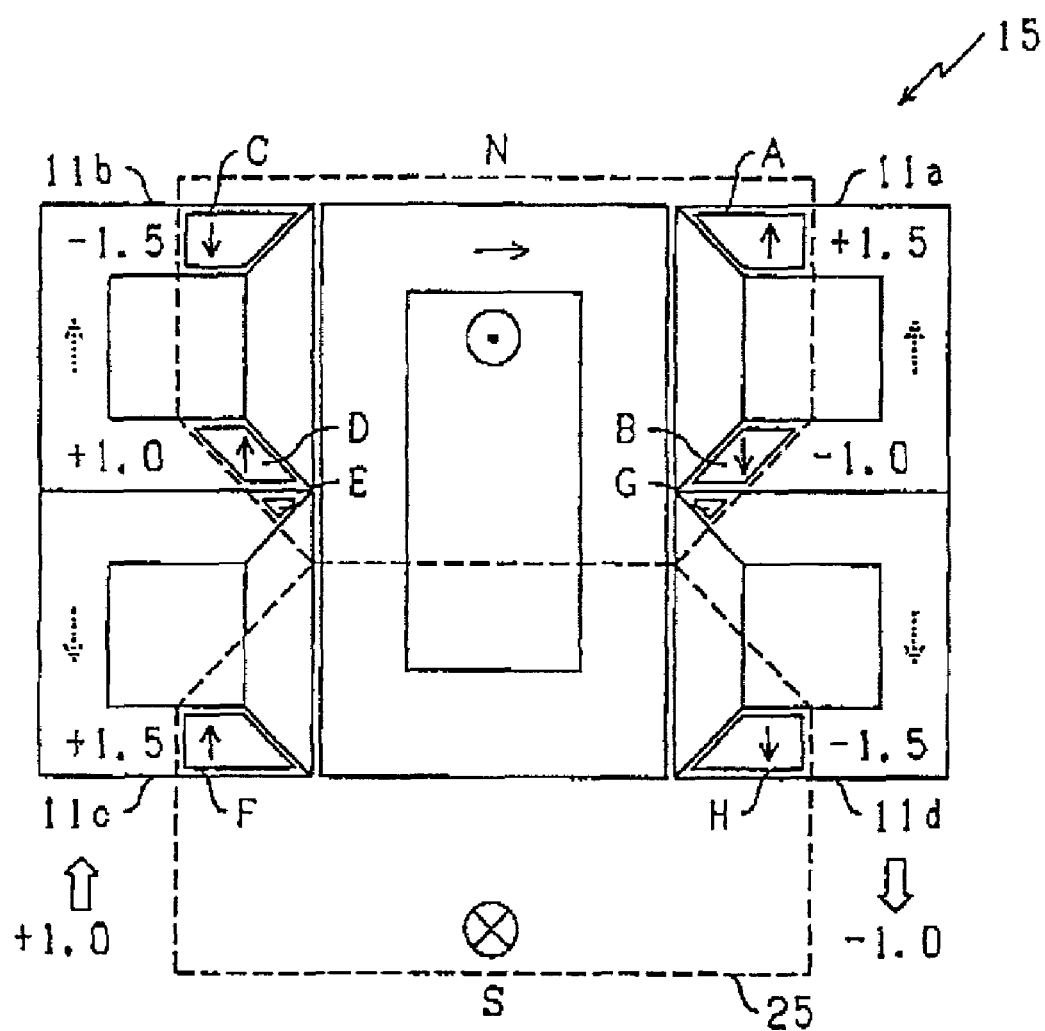
FIG. 25 is a schematic plan view for explaining an operation of the rotationally driving force induced in the printed substrate coil in the embodiment.

Next, the case of the embodiment shown in FIG. 25 will be described below. It shows the condition that the printed substrate coil 15 is moved upwardly with respect to the initial position, similarly to the above-mentioned case. In the portion B of the tracking coil 11a, the inclined portion 24c of the magnet 25 causes the area receiving the magnetic fluxes from the N-pole to be narrowed. Accordingly, the influence of the magnetic fluxes is not easily received. The portion B of the tracking coil 11a is a region indicated by two right triangles. Thus, a driving force in the focus direction of a "−1.0" is induced. Similarly, a driving force of "+1.0" is induced in the portion D of the tracking coil 11b.

On the other hand, in the portion E of the tracking coil 11c, an area receiving the magnetic fluxes from the N-pole of the magnet 25 is almost null so that the induced driving force is very weak. This situation is similar in the portion G of the tracking coil 11d. Here, the synthesis or combining of the driving forces in the focus direction induced from the four tracking coils 11a to 11d is considered. The driving force of the portion A of the tracking coil 11a and the driving force of the portion H of the tracking coil 11d have the same strength and the directions opposite to each other. Thus, they cancel out each other. Also, the driving force of the portion C of the tracking coil 11b and the driving force of the portion F of the tracking C coil 11c have the same strength and the directions opposite to each other. Thus, they cancel out each other. Hence, the focus direction driving force "−1.0" of the portion B of the tracking coil 11a and the focus direction driving force "+1.0" of the portion D of the tracking coil 11b are left. Accordingly, in the printed substrate coil 15, a rightward rotational moment force is induced by the focus direction driving force symmetrical about those two gravity centers. This rotational moment force has the strength proportional to the synthesized driving force "1.0". This is approximate ⅓ as compared with the comparison example. This implies the large suppression in the rotational moment force.

As mentioned above, the lens driving apparatus 100 according to the embodiment of the present invention employs such a configuration of the two trapezoidal small magnets 24, whose both poles are magnetized are adhered to the magnet 25 constituting the actuator unit 30. The upper and lower two tracking coils serving as the sets constituting the printed substrate coil 15 are arranged at the positions opposite to the inclined portion 24c of the small magnet 24. Thus, they do not easily receive the influence of the magnetic fluxes with regard to the adjacent portions (e.g., the portions B, D, E and G in FIG. 25), which are adjacent to the upper and lower two tracking coils. Hence, it is possible to largely suppress the rotationally driving force. Also, the actuator unit 30 is composed of the single printed substrate coil 15 and the pair of magnets 25. Hence, it is possible to suppress the rotationally driving force with little or no increase in the number of the parts.

Incidentally, the magnet 25 constituting the actuator unit 30 of the present invention is configured by the combination of the two trapezoidal small magnets 24 each having the inclined portion 24c of approximately 45 degrees. However, the present invention is not limited to the inclination angle of the inclined portion 24c. For example, any configuration may be employed as long as it is configured so as not to apply the magnetic flux to the portions adjacent to the upper and lower two tracking coils, such as a configuration in which a magnet has a laterally U-shaped missing portion around a junction between the magnetic poles adjacent to each other.

As described above, in the present invention, by constructing the magnet such that the magnetic flux is not applied to the adjacent portion of the tracking coil at the initial position, the magnetic flux applied to the adjacent portion of the tracking coil can be reduced even when the tracking coil is moved in the focus direction, so that the rotational driving force generated at the tracking coil can be reduced. Accordingly, in the above described embodiment, such a case has been explained that the magnetic flux is not applied to the adjacent portion of the tracking coil at the initial position. However, as a modified embodiment of the present invention, the magnet may be constituted such that the magnetic flux is applied to the adjacent portion of the tracking coil by a density or intensity less than that of the magnetic flux applied to the other portion of the tracking coil. As one example, with respect to a rectangular shaped magnet such as the magnet 28 in the embodiment, the magnetic polarization may be performed in the shape as in the magnet 25 in the embodiment. In such an example, the magnet generates the magnetic flux, whose density or intensity is less than that in the magnetically polarized portion, at the adjacent portion of the tracking coil, which is not magnetically polarized, due to the influence of the magnetically polarized portion. By this, such a magnet that the magnetic flux at the adjacent portion of the tracking coil at the initial portion is less than the magnetic flux at the other portion is realized. According to this modified embodiment, it is still possible to reduce the rotational driving force generated at the tracking coil, by the principle similar to that of the above described embodiment.

As described above in detail, according to the present invention, it is possible to suppress the rotational moment force of the movable body by employing a rather simple structure with little or no increase of a new part.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-341060 filed on Nov. 8, 2000 including the specification, claims, drawings and summary is incorporated herein by reference in its entirety.

What is claimed is:

1. A lens driving apparatus for driving a movable body in a focus direction and a tracking direction comprising:

a holder, to which a focus coil, a tracking coil and a lens are installed, to thereby constitute said movable body; and a magnetic circuit for applying magnetic fluxes to said focus coil and said tracking coil, to thereby drive said movable body in the focus direction and the tracking direction, said tracking coil including two sets each having upper and lower two coils arrayed in the focus direction such that the two sets are arrayed in the tracking direction, said magnetic circuit applying the magnetic fluxes opposite to each other along a jitter direction, with respect to the upper two coils and the lower two coils without applying the magnetic fluxes with respect to portions adjacent to the upper and lower two coils at least in an initial position thereof, said magnetic circuit having two magnets, in which both poles are magnetized, which are respectively including the trapezoidal part composed of a bottom portion, a top portion that is narrower in width than the bottom portion, and two inclined portions, each of the top portions of said two magnets adhering to each other.

2. A lens driving apparatus according to claim 1, wherein said two sets are arranged symmetrical about a center of gravity of said movable body.

3. A lens driving apparatus according to claim 1, wherein said focus coil comprises a single coil arranged between said two sets, and said magnetic circuit applies the magnetic fluxes opposite to each other, with respect to an upper portion and a lower portion of said focus coil.

4. A lens driving apparatus according to claim 1, wherein said focus coil and said tracking coil comprise printed substrate coils, which are printed on a single plane printed substrate.

5. A lens driving apparatus for driving a movable body in a focus direction and a tracking direction comprising:

a holder, to which a focus coil, a tracking coil and a lens are installed, to thereby constitute said movable body; and a magnetic circuit for applying magnetic fluxes to said focus coil and said tracking coil, to thereby drive said movable body in the focus direction and the tracking direction, said tracking coil including two sets each having upper and lower two coils arrayed in the focus direction such that the two sets are arrayed in the tracking direction, said magnetic circuit applying the magnetic fluxes opposite to each other along a jitter direction, with respect to the upper two coils and the lower two coils by a first density while applying the magnetic fluxes with respect to portions adjacent to the upper and lower two coils by a second density which is less than the first density at least in an initial position thereof, said magnetic circuit having magnets, in which a magnetic polarization is performed according to a shape corresponding to a portion except the portions adjacent to the upper and lower two coils, said magnetic circuit having two magnets, in which both poles are magnetized, which are respectively including the trapezoidal part composed of a bottom portion, a top portion that is narrower in width than the bottom portion, and two inclined portions, each of the top portions of said two magnets adhering to each other.

6. A lens driving apparatus according to claim 5, wherein said two sets are arranged symmetrical about a center of gravity of said movable body.

7. A lens driving apparatus according to claim 5, wherein said focus coil comprises a single coil arranged between said two sets, and said magnetic circuit applies the magnetic fluxes opposite to each other, with respect to an upper portion and a lower portion of said focus coil.

8. A lens driving apparatus according to claim 5, wherein said focus coil and said tracking coil comprise printed substrate coils, which are printed on a single plane printed substrate.

* * * * *